United States Patent
Hirata et al.

(10) Patent No.: US 11,586,040 B2
(45) Date of Patent: Feb. 21, 2023

(54) IN-VEHICLE INFORMATION DISPLAY SYSTEM AND INFORMATION DISPLAY APPARATUS

(71) Applicant: Maxell, Ltd., Kyoto (JP)

(72) Inventors: Koji Hirata, Kyoto (JP); Koji Fujita, Kyoto (JP); Eiji Takagi, Kyoto (JP); Toshinori Sugiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/423,478

(22) PCT Filed: Dec. 18, 2019

(86) PCT No.: PCT/JP2019/049531
§ 371 (c)(1),
(2) Date: Jul. 16, 2021

(87) PCT Pub. No.: WO2020/149078
PCT Pub. Date: Jul. 23, 2020

(65) Prior Publication Data
US 2022/0075189 A1 Mar. 10, 2022

(30) Foreign Application Priority Data
Jan. 17, 2019 (JP) .............................. JP2019-005873

(51) Int. Cl.
*G02B 27/01* (2006.01)
*G09G 3/00* (2006.01)
*B60K 35/00* (2006.01)

(52) U.S. Cl.
CPC .......... *G02B 27/0101* (2013.01); *B60K 35/00* (2013.01); *G09G 3/002* (2013.01);
(Continued)

(58) Field of Classification Search
CPC ................ G02B 27/0101; G02B 27/01; G02B 2027/011; G02B 2027/0118;
(Continued)

(56) References Cited

U.S. PATENT DOCUMENTS

2008/0186587 A1* 8/2008 Matsushita ........ G02B 27/0101
359/630
2010/0066645 A1* 3/2010 Ishii .................. G02B 27/0101
345/7
(Continued)

FOREIGN PATENT DOCUMENTS

JP 7-230059 A 8/1995
JP 2001-166702 A 6/2001
(Continued)

OTHER PUBLICATIONS

International Search Report and Written Opinion dated Mar. 17, 2020, received for PCT Application PCT/JP2019/049531, Filed on Dec. 18, 2019, 20 pages including English Translation.
(Continued)

*Primary Examiner* — Brent D Castiaux
(74) *Attorney, Agent, or Firm* — Xsensus LLP

(57) ABSTRACT

An information display apparatus that displays image information on a vehicle includes a HUD apparatus projecting a large-scale virtual image onto a distant position and serving as a first information display apparatus 100 arranged between a windshield glass 6 of the vehicle and an instrument panel, and effectively displays a plurality of pieces of the image information by making coordination with a second information display apparatus 48 close to the windshield glass 6, the second information display apparatus causing a transparent dispersion sheet in the windshield glass to directly reflect a screen of a large-scale high-resolution image display panel so that the screen is observed by the driver.

15 Claims, 13 Drawing Sheets

(52) U.S. Cl.
CPC ............. *B60K 2370/1526* (2019.05); *B60K 2370/1529* (2019.05); *B60K 2370/785* (2019.05); *G02B 2027/011* (2013.01); *G02B 2027/0118* (2013.01); *G02B 2027/0147* (2013.01); *G09G 2360/04* (2013.01); *G09G 2380/10* (2013.01)

(58) Field of Classification Search
CPC ........ G02B 2027/0147; G02B 27/0018; G02B 3/08; B60K 35/00; B60K 2370/1526; B60K 2370/1529; B60K 2370/785; B60K 2370/182; B60K 2370/184; G09G 3/002; G09G 3/342; G09G 2360/04; G09G 2380/10

See application file for complete search history.

(56) References Cited

U.S. PATENT DOCUMENTS

| | | | |
|---|---|---|---|
| 2014/0268358 A1 | 9/2014 | Kusaka et al. | |
| 2016/0195719 A1 | 7/2016 | Yonetani | |
| 2017/0092169 A1* | 3/2017 | Kuzuhara | G09G 3/007 |
| 2017/0219818 A1* | 8/2017 | Fang | G02B 5/3083 |
| 2017/0363866 A1* | 12/2017 | Murzyn | G02B 27/0101 |
| 2018/0210201 A1* | 7/2018 | Togasaki | G02F 1/133606 |
| 2018/0348515 A1 | 12/2018 | Kuzuhara et al. | |
| 2018/0350236 A1* | 12/2018 | Yamaguchi | G08G 1/04 |
| 2019/0235240 A1 | 8/2019 | Nagano et al. | |
| 2019/0265472 A1 | 8/2019 | Sugiyama et al. | |

FOREIGN PATENT DOCUMENTS

| | | |
|---|---|---|
| JP | 4788882 B2 | 10/2011 |
| JP | 3183407 U | 5/2013 |
| JP | 2014-174494 A | 9/2014 |
| JP | 2015-194707 A | 11/2015 |
| JP | 2017-97074 A | 6/2017 |
| JP | 2019-3081 A | 1/2019 |
| WO | 2013/190959 A1 | 12/2013 |
| WO | 2017/094249 A1 | 6/2017 |
| WO | 2018/056198 A1 | 3/2018 |
| WO | 2018/117012 A1 | 6/2018 |

OTHER PUBLICATIONS

Tanahashi et al., "Development of Full-Color Head-Up Display Using Laser Projector", PIONEER R&D, vol. 22, 2013, 27 pages including English Translation.

\* cited by examiner (a)

(b)

(a)

(b)

(a)

(b)

REFLECTANCE OF P-POLARIZED LIGHT AND S-POLARIZED LIGHT ON GLASS

IN-VEHICLE INFORMATION DISPLAY SYSTEM AND INFORMATION DISPLAY APPARATUS

CROSS-REFERENCE TO RELATED APPLICATIONS

The present application is based on PCT filing PCT/JP2019/049531, filed Dec. 18, 2019, which claims priority to JP 2019-005873, filed Jan. 17, 2019, the entire contents of each are incorporated herein by reference.

TECHNICAL FIELD

The present invention relates to an information display system that projects images onto a windshield glass or a combiner of a car, a train, an airplane or others (collectively referred to as "vehicle" below), and, more particularly, relates to an in-vehicle information display apparatus and an information display apparatus in which the windshield glass returns and reflects the images as if to be a mirror so that real images or virtual images of the images can be observed.

BACKGROUND ART

So-called Head-Up-Display (HUD) apparatus has been already known from, for example, the following Patent Document 1, the head-up-display apparatus creating virtual images by projecting image light onto a windshield glass or a combiner of a car to display traffic information such as route information and traffic congestion information and car information such as a fuel level and a coolant temperature.

For such a type of information display apparatus, while it is desirable to expand a region where a driver can observe the virtual images, high legibility and high resolution of the virtual images are also important performance factors.

The head-up-display apparatus provides the driver with the virtual images to be enlarged images of the images displayed on the image display apparatus by using an optical system including a concave mirror (having a function of a convex lens), and always needs a windshield glass or a combiner serving as a terminal reflection mirror.

In the image display apparatus for use in the head-up-display apparatus as described above, a liquid crystal display element (liquid crystal display panel) is often used because of easily creating the high-quality images and being inexpensive. However, it has been found that, since a small liquid crystal display element is used for downsizing of a set, the liquid crystal display element has a new problem causing a lack of resolution of the provided projection images so that the liquid crystal display element is inappropriate for the display of the high-resolution images displayed on, for example, a smartphone or others.

In order to support the resolution of the head-up-display apparatus, the present invention relates to technical means achieving an in-vehicle information display system along with an image information display apparatus by using technical means depending on an image display region of external scenery that the driver observes through the windshield glass, and achieving an information display apparatus including the information display apparatus for use in this system to provide the driver with the high-resolution image information.

According to the following Patent Document 2, a head-up-display apparatus has been already known, the head-up-display apparatus having a transmitting/reflecting member (hot mirror) that transmits the display light output from the liquid crystal display panel but reflects the infrared ray in order to protect the inexpensive liquid crystal display panel used as the image source of the information display apparatus from being damaged by the sunlight, the transmitting/reflecting member being arranged on a forward part of and separate from the liquid crystal display panel so as not to be paralleled.

Meanwhile, an apparatus having a main body including the combiner attached to vicinity of a roof ceiling (sun visor) of a car as disclosed in the following Non-Patent Document 1 has been already proposed as a head-up-display apparatus having a different structure. However, the apparatus has a possibility of, for example, making the driver injured by detachment of the HUD apparatus when impact accident occurs, and therefore, the apparatus still has safety problems. Thus, in the head-up-display apparatuses, it is conceivable that a method of causing the windshield glass to directly reflect the image light becomes a mainstream.

RELATED ART DOCUMENTS

Patent Documents

Patent Document 1: Japanese Patent Application Laid-Open Publication No. 2015-194707
Patent Document 2: Japanese Patent No. 4788882

Non-Patent Document

Non-Patent Document 1: PIONEER R&D (Vol. 22, 2013)

SUMMARY OF THE INVENTION

Problems to be Solved by the Invention

In the example of the head-up-display apparatus disclosed in the Patent Document 1 that is the related art, the apparatus includes a device that displays images and a projection optical system that projects the displayed images onto a display device, the projection optical system including a first mirror and a second mirror arranged in a light path extending for an observer from the display device, and the apparatus is achieved when satisfying predetermined conditions of a relation among an incident angle on the first mirror in an image long-axis direction, an incident angle on the first mirror in an image short-axis direction, a distance between the first mirror and an image display surface of the display device, and a width of a virtual image in a horizontal direction visually recognized by the observer. However, the document does not describe the specific solving means for achieving the high resolution of the images, and besides, does not describe even the new problem that is the significant reduction in the performance due to the penetration of the sunlight through the windshield glass and the collection of the light on the concave mirror under predetermined conditions in the daytime to damage the images on the liquid crystal panel and the polarizer.

A method of making use of the windshield glass as a reflection surface as described in the Patent Document 1 is conceivable to be a mainstream in the future. However, a support for achieving the high resolution of the displayed images of the information terminal represented by the smartphone has not been considered at all. In addition, countermeasures against occurrence of so-called burning (carbonization) under predetermined conditions in the daytime that becomes a very important issue for practical use of the in-vehicle information display apparatus has not been considered at all, either, the burning transforming the polarizer or the liquid crystal panel arranged on a light-outgoing side of the liquid crystal display apparatus due to heat and light intensity of the sunlight so as to fail to correctly function because the sunlight penetrating the windshield glass and being collected on the concave mirror is collected onto the polarizer or the liquid crystal panel.

Similarly, even in the technique disclosed in the Non-Patent Document 1 taking the combiner as the terminal reflection surface, the achievement of the high resolution of the displayed images and the new problem in the usage of the image display element as the liquid crystal panel are not considered at all, the new problem being the significant reduction in the performance due to the penetration of the sunlight through the windshield glass and the combiner and the collection of the light onto the concave mirror under predetermined conditions in the daytime to damage the liquid crystal panel and the polarizer.

Further, in the Patent Document 2, it is proposed that the transmitting/reflecting member (hot mirror) for use in selectively reflecting the infrared ray of the sunlight should be arranged on a light path in order to reduce the possibility of the damage on the liquid crystal display panel due to the sunlight. However, the incident sunlight contains not only the infrared ray but also light rays in a visible light band and an ultraviolet light band, and therefore, the reduction in only the infrared ray is insufficient for the reduction in the damage on the liquid crystal display element and the polarizer due to the sunlight. Further, a new problem and the achievement of the high resolution of the displayed images are not considered at all, the new problem being significant reduction in the quality of the images that are visually recognized by a driver, more particularly significant reduction in a contrast performance and appear resolution of the images, adversely affected by the penetration of the external light containing the visible light.

In the head-up-display apparatus serving as the information display apparatus that provides the driver with the image information according to the related art as described above, it is necessary to use a large-scale liquid crystal display element in order to provide the driver with the displayed images having the high resolution, and therefore, a first problem incapable of achieving both the downsizing and the high resolution in the apparatus has been revealed.

Further, in the practical mounting of the liquid crystal panel used as the image display apparatus of the head-up-display apparatus, a second problem that is the significant reduction in the performance due to the penetration of the sunlight through the windshield glass and the collection of the light onto the concave mirror under the predetermined conditions in the daytime to damage the liquid crystal panel and the polarizer has been also revealed.

The present invention has been made in consideration of the problems according to the related arts, and a purpose of the present invention is specifically to provide an in-vehicle information display system and an information display apparatus for the system capable of achieving both downsizing and high resolution in the apparatus and being practically usable.

Means for Solving the Problems

In order to achieve the purpose, the present invention provides an in-vehicle information display system that is an information display system causing a windshield glass of a vehicle to reflect image light to display image information for an observer, the in-vehicle information display system including: a first information display apparatus configured to cause the windshield glass to reflect the image light so that the observer observes a virtual image; and a second information display apparatus configured to cause the windshield glass to reflect the image light so that the observer observes a reflected image, and resolution of an image displayed by the first information display apparatus being lower than resolution of an image displayed by the second information display apparatus.

And, the present invention provides an information display apparatus for use in configuration of an information display system causing a windshield glass of a vehicle to reflect image light to display image information for an observer, the information display apparatus including, inside an enclosure partially having an opening: image-light generating means configured to generate the image light for use in displaying the image information; image-light processing means configured to perform a predetermined optical process to the image light output from the image-light generating means; and means configured to project the image light output from the image-light processing means so that the observer recognizes the image information as a virtual image on a forward part of the windshield glass through the opening of the enclosure.

Further, the present invention provides an information display apparatus for use in configuration of an information display system causing a windshield glass of a vehicle to reflect image light to display image information for an observer, the information display apparatus including: a backlight apparatus configured to generate illumination light flux having strong directionality; a display panel configured to module the illumination light flux having the strong directionality output from the backlight apparatus in accordance with the image information and emitting the light to the windshield glass; and a light-direction converting panel configured to convert the image light output from the display panel so that the observer recognizes the image light as a reflected image on a forward part of the windshield glass.

Effects of the Invention

As an information display apparatus configured to provide image information to be reflected by a windshield glass toward external scenery that is observed through the windshield glass when a driver is driving a subject car, the present invention can provide an in-vehicle information display system configured to use the head-up-display apparatus to display a large-scale virtual image at a distant position of a partial region of the windshield glass while causing the windshield glass to reflect an image output from a large-scale high-resolution image display apparatus toward a lower end region of the windshield glass so that the driver or a passenger can directly observe the reflected image. As a result, the necessary information for the driver can be suitably displayed as an image having a different resolution and a different image size on the windshield glass.

On the other hand, along with the downsizing of the head-up-display apparatus, the present invention can correct distortion and aberration of the virtual image observed by the driver due to the external light including the sunlight, and besides, can suppress the reduction in the performance caused by the collection of the external light including the incident sunlight (much of which is P-polarized wave component) through the windshield glass due to the concave mirror forming the virtual-image optical system to damage the liquid crystal panel, the polarizer or others that is the image display apparatus, in other words, can provide the information display apparatus for the in-vehicle information display system configured to form the virtual image having the excellent performance by reducing the adverse influence of the light having wavelengths in a wide range contained in the external light including the sunlight.

BRIEF DESCRIPTIONS OF THE DRAWINGS

BEST MODE FOR CARRYING OUT THE INVENTION

Figure 1:
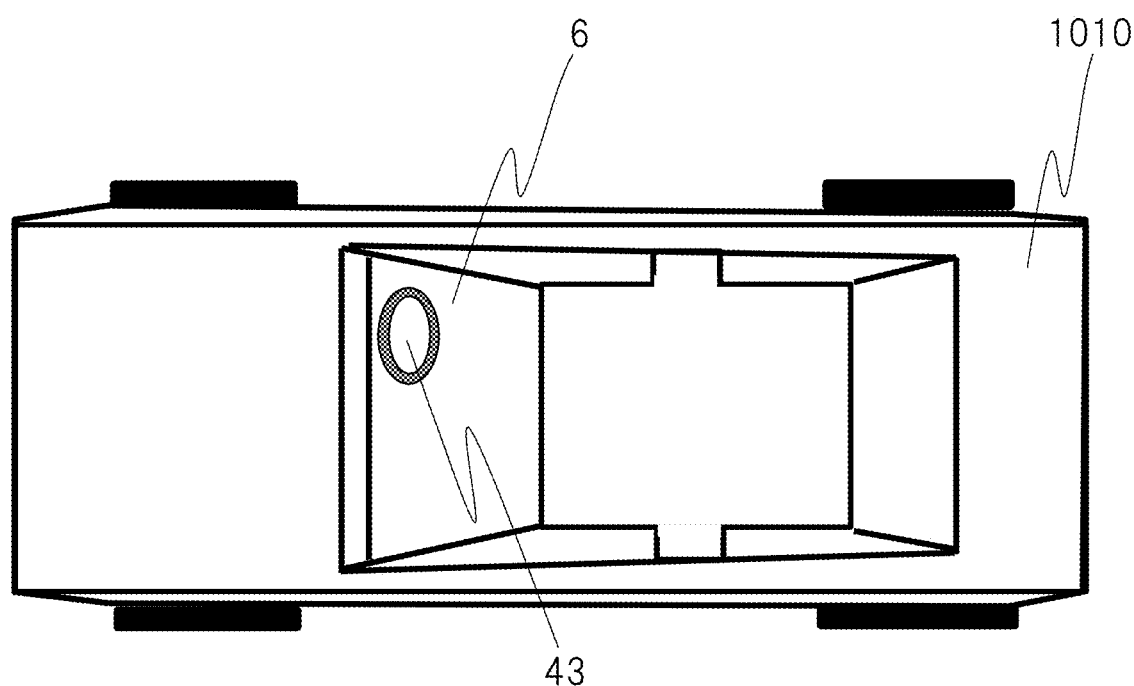
FIG. 1 is a top view of a car mounting an in-vehicle information display system of the present invention and a diagram for explaining difference in a curvature radius of a windshield glass.
Figure 1:
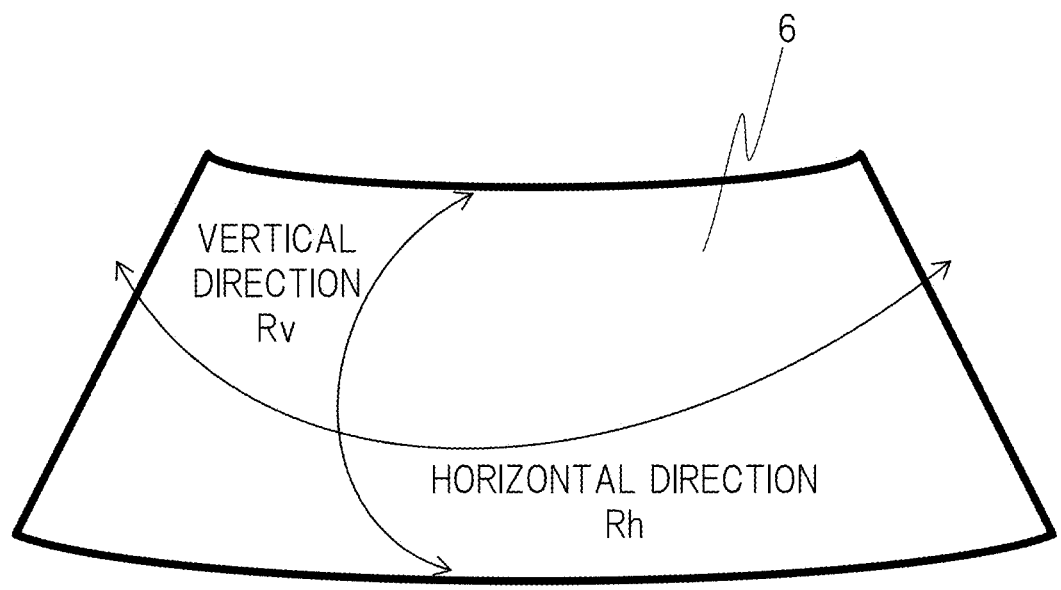

Hereinafter, working examples of the present invention will be described in detail with reference to drawings and others. Note that the present invention is not limited to the following explanation, and various modifications and alterations can be made by those who are skilled in the art within the scope of the technical concept disclosed in the present application. Also, components having the same function are denoted by the same reference symbols throughout all the drawings for describing the embodiments, and the repetitive description thereof will be omitted.

Outline of In-Vehicle Information Display System

FIG. 1(a) is a top view of an information display apparatus 100 according to a later-described working example of the present invention, mounted on a car, a train, an airplane and others, more particularly on the car. A forward part of a driver seat of a car 1010 has a windshield glass 6 serving as a projection-receiving member. An inclined angle of this windshield glass 6 with respect to a car body varies depending on a type of the car. Further, the present inventors have also studied on its curvature radius in order to achieve a suitable virtual-image optical system. As a result, it has been found that the windshield glass 6 has a curvature radius "Rh" in a horizontal direction that is horizontal to a grounded surface of the car and a curvature radius "Rv" in a direction that is vertical to the horizontal axis that are different from each other as shown in FIG. 1(b), and it has been found that the following relation is generally established between Rh and Rv.

Rh>Rv

Also, it has been also found that the difference in the curvature radius, in other words, Rh with respect to Rv is in a range to be 1.5 times to 2.5 times.

In the present invention, when the driver is driving the subject car, the image information is reflected by the windshield glass and is displayed on the external scenery that is observed through the windshield glass. The information display apparatus partitions the windshield glass into a plurality of regions, and causes the head-up-display apparatus to display the large-scale virtual image at a distant position in some regions. On the other hand, for example, the image output from the large-scale high-resolution image display apparatus is reflected on the lower end region of the windshield glass by the windshield glass, and the driver or the passenger directly observes the reflected image. This manner results in the information image system capable of suitably displaying the necessary information for the driver so that the resolution and the image size very depending on the display region of the windshield glass.

As the head-up-display apparatus of one example, an information display apparatus displaying the image information to be the virtual image on the projection surface is provided, the information display apparatus including, inside an enclosure partially having an opening, image-light generating means configured to generate the image light for displaying the image information, image-light processing means configured to perform a predetermined optical process to the image light output from the image-light generating means, and means configured to project the image light output from the image-light processing means through the opening of the enclosure onto the projection surface so that the observer can recognize the image information as the virtual image on the forward part of the projection surface.

More specifically, as described in detail later, in the information display apparatus of the present invention, a glare stop 41 arranged in the opening has a polarizer that absorbs the P-wave sunlight. In other words, the polarizer absorbs the P-polarized light of the sunlight, and transmits the S-polarized light of the sunlight. The polarizer is, for example, a λ/4 plate, a λ/8 plate or a λ/16 plate. Since the P-wave component is absorbed by the glare stop 41, the following effects can be obtained.

(1) The P-polarized sunlight component penetrating the windshield glass (and then, in the combiner mode, penetrating the combiner) under the predetermined conditions in the daytime is absorbed at a position before the concave mirror, so that the sunlight penetrating the windshield glass does not return to the liquid crystal panel and the polarizer.

(2) When the information display apparatus is not used, the sunlight collected by the concave mirror is prevented from returning to the image display apparatus by the rotation of the concave mirror by a predetermined angle so that the sunlight does not return to the image display apparatus.

Further, the information image system is provided, the information image system including the large-scale high-resolution image display apparatus at a position of a dash board corresponding to the image display region in the lower end region of the windshield glass so that the displayed image is reflected by the windshield glass to make the driver or the passenger directly observe the reflected image. When a transparent screen having a function of scattering the image light is arranged in the windshield glass corresponding to the image display position so as to achieve the efficient reflection, the image having the image quality without the practical problem can be provided to the driver or the passenger. The large-scale high-resolution image display apparatus controls the outgoing direction of the image light because the light has high luminance, so that the image light is prevented from directly entering the eyes of the driver or the passenger.

First Image Display Apparatus of In-Vehicle Information Display System

Figure 2:
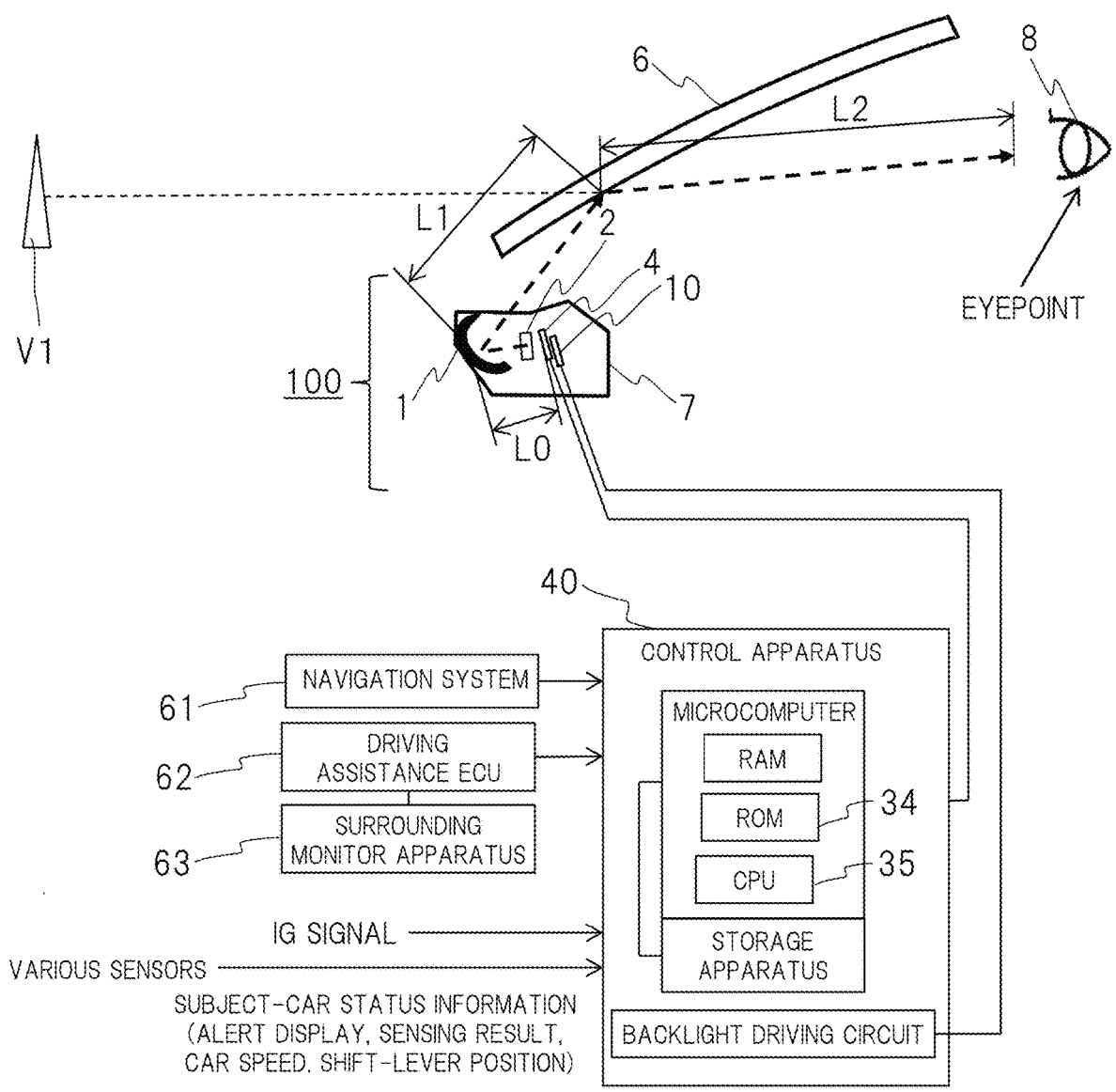
FIG. 2 is a diagram showing a schematic configuration including a virtual-image optical system of a first information display apparatus according to an embodiment of the present invention.

FIG. 2 is a schematic configurational diagram showing a peripheral apparatus configuration of a first information display apparatus of the in-vehicle information display apparatus of the present invention. In the specification, an information display apparatus 100 that projects the image onto the windshield glass 6 of the car will be explained as one example. The head-up-display apparatus serving as the information display apparatus 100 according to one working example of the present invention is an apparatus (so-called HUD (Head up Display)) that displays various types of information reflected by a projection-receiving member (in the present working example, an inner surface of the windshield glass 6) as a virtual image "VI" in order to form the virtual image VI on the forward part of the subject car on a driver's line of sight (eyepoint: described in detail later). From a navigation system 61, an illustrated controlling apparatus 40 configuring this HUD apparatus acquires various types of information such as a speed limit and the number of lanes of a road corresponding to a current position at which the subject vehicle is running, a travelling-scheduled route of the subject vehicle installed in the navigation system 61 or others as foreground-scenery information (that is information displayed to be the virtual image on the forward part of the subject vehicle).

A driving assistance ECU 62 illustrated is a controlling apparatus that achieves driving assistance control by controlling a driving system and a control system in accordance with obstacles detected as a monitoring result of a surrounding monitoring apparatus 63. The driving assistance control includes publicly-known techniques such as a cruise control system, an adaptive cruise control system, a pre-crash safety system and a lane keeping assist system.

A surrounding monitoring apparatus 63 illustrated is an apparatus that monitors a surrounding state of the subject vehicle, and is, as one example, a camera that detects an object existing in surroundings of the subject vehicle on the basis of a captured surrounding image of the subject vehicle, an exploration apparatus that detects an object existing in surroundings of the subject vehicle on the basis of a result of transmission/reception of exploration waves, and others.

As the foreground-scenery information, the controlling apparatus 40 of the HUD apparatus acquires the information (such as a distance to a vehicle running ahead, a direction of the vehicle running ahead, positions of obstacles and traffic signs and others) from such a driving assistance ECU 62. Further, to the controlling apparatus 40, an ignition (IG) signal and subject-car status information are input. The "subject-car status information" of such information is information acquired as the vehicle information, and includes alert information not being needed to have high-resolution display and showing, for example, occurrence of a predetermined abnormal state of a fuel level of an internal combustion engine, a coolant temperature or others. And, the information also includes an operational result of a turn signal and a running speed of the subject vehicle, and besides, shift-lever position information and others. The above-described controlling apparatus 40 is activated by the input of the ignition signal. The above description is the explanation for the entire system of the information display apparatus of the present working example.

Note that the projection-receiving member needs to be only a member on which the information is projected, and may be not the windshield glass 6 but the combiner. In other words, in the information display apparatus 100 of the present working example, the virtual image needs only to be formed on the forward portion of the subject vehicle on the driver's line of sight 8 and be visually recognized by the driver.

The information display apparatus 100 having the configuration is provided with the image display apparatus 4 that projects the image light for displaying the information and a correction lens element 2 for correcting the distortion and the aberration caused when the virtual image is formed from the image displayed on the image display apparatus 4 by the concave (free curved) mirror 1. The image light flux from this information display apparatus 100 is emitted from the opening (not illustrated) toward the windshield glass 6.

The information display apparatus 100 is further provided with the controlling apparatus 40 that controls the image display apparatus 4 and the backlight. Note that the optical components including the image display apparatus 4, the backlight and others configure a virtual-image optical system described later, and includes the concave mirror 1 that reflects the light. The light reflected by these optical components is reflected by the windshield glass 6 that is the projection-receiving member, and travels to the driver's line of sight.

As the above-described image display apparatus 4, for example, note that not only an LCD (Liquid Crystal Display) having a backlight but also a self-luminescent VFD (Vacuum Fluorescent Display) and others are cited.

Meanwhile, the image may be displayed on a screen by a projection apparatus in place of the above-described image display apparatus 4, be created as the virtual image by the above-described concave mirror 1, be reflected by the windshield glass 6 or the combiner (not illustrated) that is the projection-receiving member, and travel to the driver's point of view 8.

In this case, in order to reduce the distortion of the virtual image, a shape of the concave mirror 1 may have an upper portion (a region that reflects the light beam on a lower portion of the windshield glass 6 having a relatively small distance to the driver's point of view 8) shown in FIG. 1 having a relatively small curvature radius so as to increase a magnification power but have a lower portion (a region that reflects the light beam on an upper portion of the windshield glass 6 having a relatively large distance to the driver's point of view) having a relatively large curvature radius so as to decrease the magnification power. Alternatively, more favorable correction is also achieved by tilting the image display apparatus 4 from the optical axis of the concave mirror to correct the difference in the virtual-image magnification, which results in the reduction in the occurrence of the distortion itself.

Meanwhile, as shown in FIG. 1(*b*), the windshield glass 6 of the car has a curvature radius "Rv" in a vertical direction of the main body and a curvature radius "Rh" in a horizontal direction of the same that are different from each other, and a relation of "Rh>Rv" is generally established. Therefore, when the windshield glass 6 is regarded as the reflection surface, the windshield glass 6 becomes a toroidal surface of the concave mirror 1. Therefore, in the information display apparatus 100 of the present embodiment, the shape of the concave mirror 1 may have an average curvature radius that is different between the horizontal direction and the vertical direction so as to correct the virtual-image magnification depending on the shape of the windshield glass 6, that is, correct the difference in the curvature radius between the vertical direction and the horizontal direction of the windshield glass 6. In this case, the shape of the concave mirror 1 as a spherical or aspherical shape (expressed by an expression (2) below) that is symmetrical across the optical axis is expressed by a function of a distance "r" from the optical axis, and a horizontal cross-sectional shape and a vertical cross-sectional shape of each of distant regions cannot be individually controlled, and therefore, the shape is preferably corrected so as to follow a function of plane coordinates (x, y) with respect to the optical axis of the mirror surface so as to be a free curved surface expressed by a [numerical expression 1] described below.

[Numerical Expression 1]

$$Z = \frac{c \cdot (x^2 + y^2)}{1 + \sqrt{1 - (1 + K)c^2 \cdot (x^2 + y^2)}} + \sum \sum (Cj(m, n) \times x^m \times y^n) \quad (1)$$

[Numerical Expression 2]

$$Z = \frac{c \cdot h^2}{1 + \sqrt{1 - (1 + K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20} \quad (2)$$

Entering of Sunlight into Apparatus and Principal of Suppression of Entering

Figure 3:
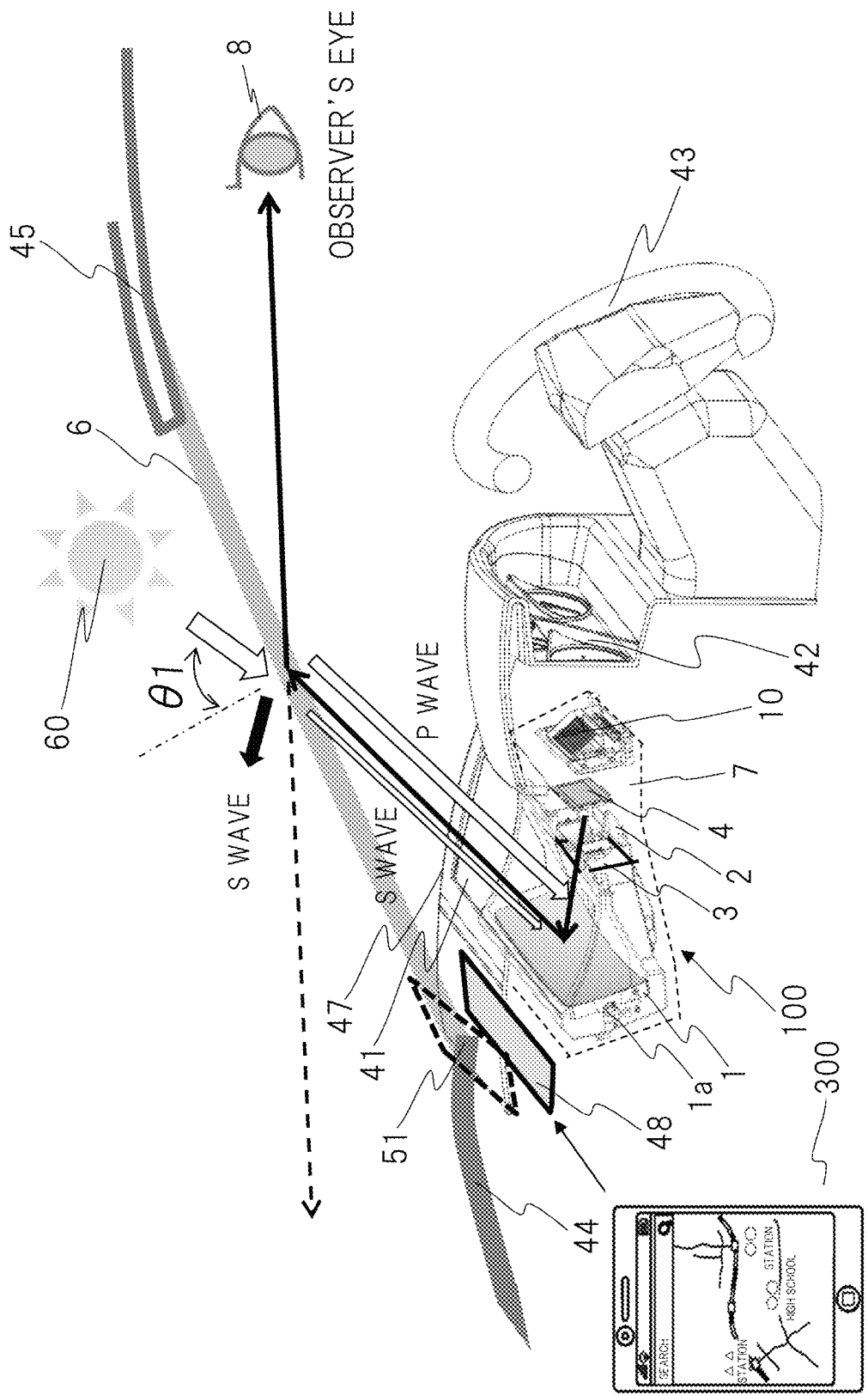
FIG. 3 is a schematic configurational diagram showing a relation among a first information display apparatus, a second information display apparatus, a windshield glass, a driver's point-of-view position and sunlight.
Figure 4:
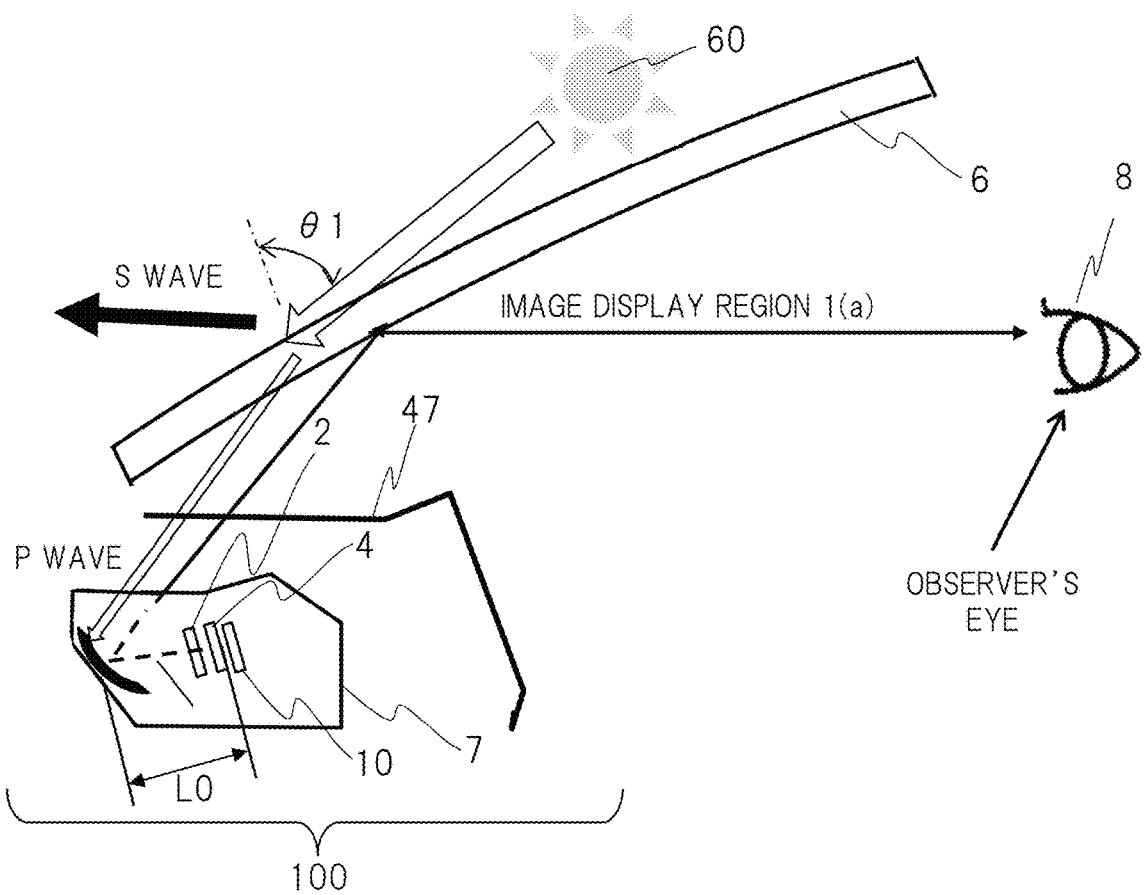
FIG. 4 is a schematic configurational diagram showing a relation among a first information display apparatus of an in-vehicle information display system, a windshield glass, an image display position, a driver's point-of-view position and sunlight.
Figure 5:
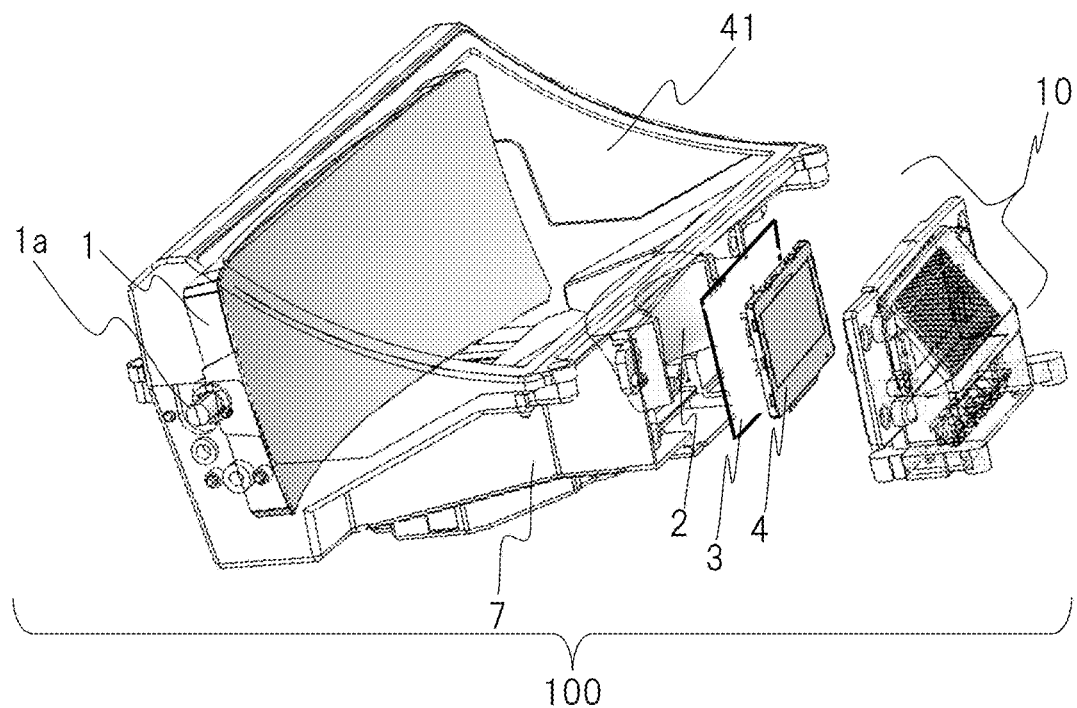
FIG. 5 is a schematic configurational diagram according to a first information display apparatus of an in-vehicle information display system.

Next, the entering of the sunlight into the above-described information display apparatus in the driver seat of the vehicle will be explained. In FIG. 3 showing a state of a vicinity of the driver seat of the vehicle, the information display apparatus 100 is behind the dashboard (to be closer to a rear bonnet (hood)) including meters such as a speed meter 42, on the lower portion of the windshield glass 6 attached between the bonnet 44 and a roof ceiling plate 45 configuring the car body. In this drawing, the sun 60 in the daytime in addition to a steering 43 of the vehicle and the eye 8 of the observer who is the driver are illustrated on the upper portion of the vehicle. FIG. 4 mainly shows the sun 60, the windshield glass 6 and the observer's eye 8 that are extracted from the configuration of FIG. 3, and FIG. 5 shows a configuration housed in an enclosure 7 of the information display apparatus 100.

In FIGS. 3 and 4, as shown with an open arrow, the intent light from the sun 60 enters the windshield glass 6 of the vehicle at an incident angle θ1, and a part of the light is reflected by the windshield glass 6 while the rest of the light enters the apparatus through the glare stop 41 (see FIG. 5) that is arranged in the opening on the upper portion of the information display apparatus 100 and that blocks the reflected light being unrelated to the image reflected by an optical element or a structure inside the enclosure. In this case, as clearly seen in FIG. 4, particularly at an incident angle that is equal to or larger than 50 degrees, much of the S-polarized light component (S wave) of the sunlight is reflected on the windshield glass 6 as shown in FIG. 4. As a result, much of the sunlight entering the information display apparatus 100 becomes the P-polarized light component (P wave).

On the other hand, as shown with a solid arrow in FIGS. 3 and 4, the image light outgoing from the information display apparatus 100 is reflected on the windshield glass 6 or the combiner (not illustrated) and enters the observer's eye 8.

Figure 16:
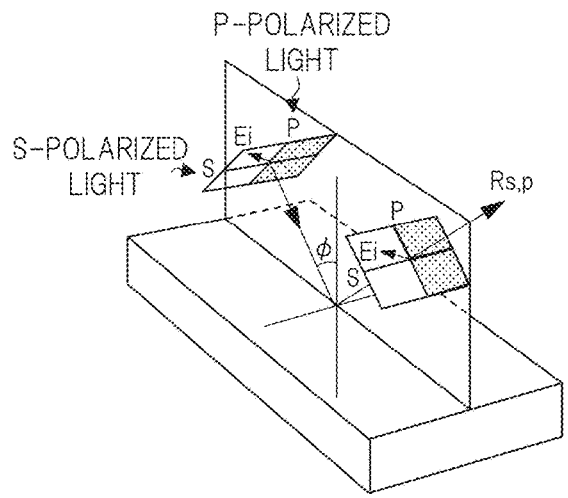
FIG. 16 is a schematic diagram for explaining change in reflectance of S-polarized light and P-polarized light on a glass at an incident angle.
Figure 16:
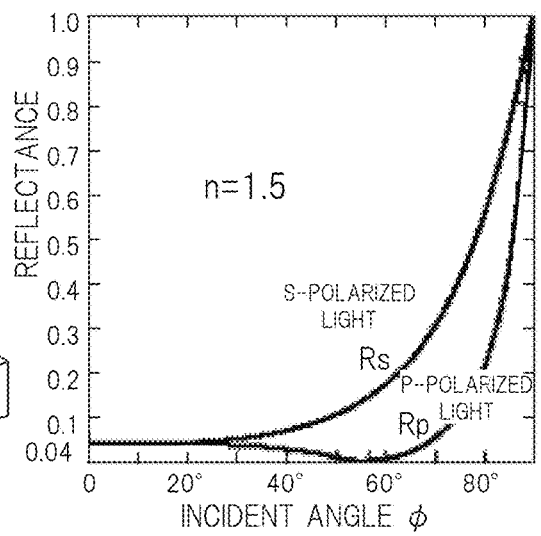
Figure 17:
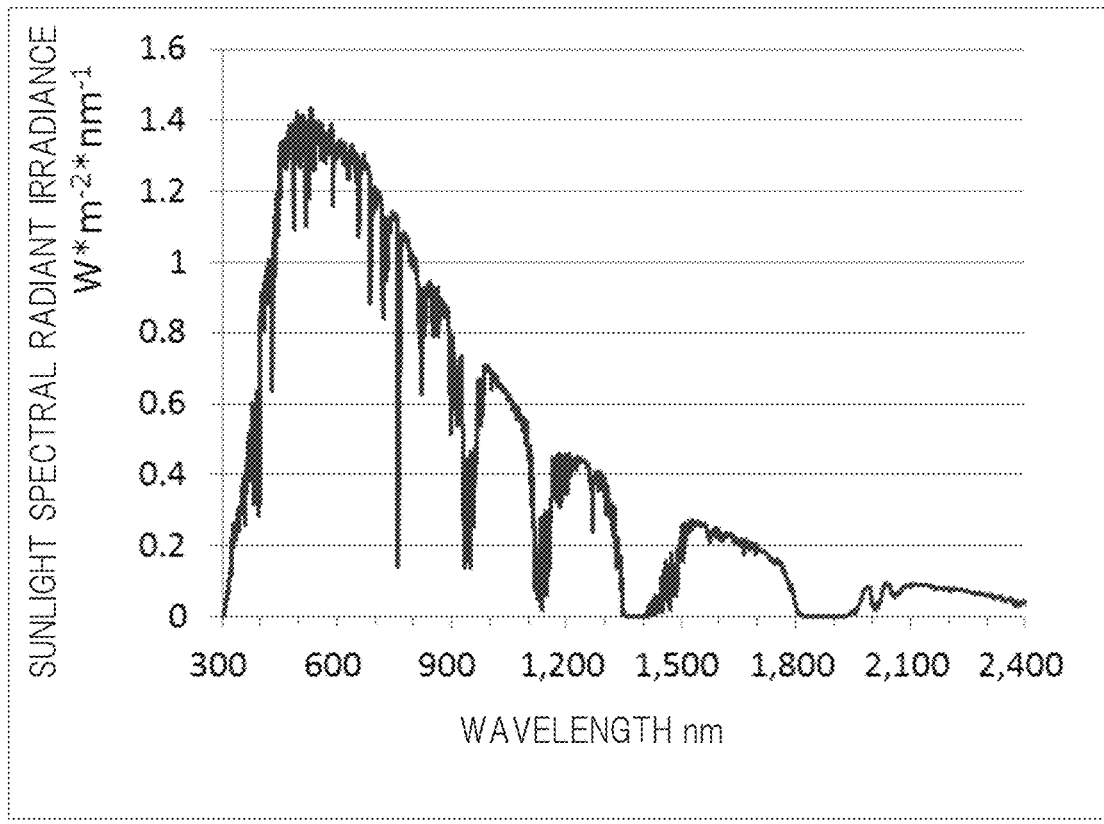
FIG. 17 is a diagram showing spectral irradiance of sunlight.

More specifically, the natural light such as the sunlight exists to be not only the light in a wide wavelength band from ultraviolet ray to infrared ray as shown in FIG. 17 but also the mixture light in two polarizing directions (hereinafter, referred to as S-polarized light and P-polarized light) having the respective polarizing directions that are a vertical oscillating direction to a light propagating direction and a horizontal oscillating direction to the light propagating direction. In a region where the incident angle on the windshield glass 6 is larger than 50 degrees as described above, the reflectance on the glass surface varies depending on whether the light is the S-polarized light or the P-polarized light, and besides, depending on the incident angle as shown in FIG. 16.

Accordingly, in the present working example, on the basis of the findings from the study made by the inventors, in other words, in consideration of the fact that much of the sunlight entering through the windshield glass 6 is the P-polarized light component, the inventors have verified that the reduction in the P-polarized wave component is effective and the usage of the S-polarized wave component as the image light projected from the information display apparatus 100 is effective for suppressing the external light including the sunlight entering the information display apparatus 100.

Specific Working Example of First Information Display Apparatus

Subsequently, a specific optical configuration of the information display apparatus 100 configured on the basis of the findings will be explained.

The configuration of the information display apparatus 100 according to one working example of the present invention will be explained with reference to FIG. 3. For example, a lens element 2 is arranged as a transmittable optical component between the image display apparatus 4 and the concave mirror 1. The lens element 2 corrects the distortion of the virtual image resulted from the correction for the outgoing direction of the light beam to the concave mirror 1 in addition to the shape of the concave mirror 1, and besides, corrects the aberration including astigmatism resulted from the difference between the curvature radius in the horizontal direction of the windshield glass 6 and the curvature radius in the vertical direction of the same.

In order to further enhance a performance of the aberration correction, the lens element 2 may be made of a plurality of lenses. Alternatively, the distortion can be also reduced by arranging and using a curved (free curved) surface mirror in place of the lens element 2 to bend the light path, and besides, to control the incident position of the light beam on the concave mirror. As described above, it is needless to say that even the arrangement of the suitably-designed optical element between the concave mirror 1 and the image display apparatus 4 in order to improve the performance of the aberration correction is within the technical concept or the scope of the present invention. Further, by change in a thickness of the lens element 2 in the optical axis direction, an optical distance between the concave mirror 1 and the image display apparatus 4 is changed, which results in consecutive change in the display position of the virtual image ranging from a distant position to a close position in addition to the aberration correction.

Among the sunlight entering from outside of the car, the S-polarized light component is reflected by the windshield glass 6 while the P-polarized light component penetrates and travels in the car and enters the information display apparatus 100 through the opening. The polarizer that absorbs the P-wave component of the entering sunlight but transmits the S-wave component of the same is arranged on one-side surface of the glare stop 41 arranged in the opening. Further, a reflective film that reflects the light in the ultraviolet waveband and the infrared waveband is arranged on the other-side surface of the glare stop 41 or the sunlight incident surface of the polarizer. As a result, the P-polarized wave in the visible-light waveband and much of the light in the ultraviolet waveband and the infrared waveband do not enter the image display apparatus 4. As a result, the damage of the sunlight on the image display apparatus 4 is reduced.

Meanwhile, as a cause of the reduction in the image quality of the image display apparatus 100, it is known that the image quality is reduced because the image light beam emitted from the image display apparatus 4 toward the concave mirror 1 is reflected by the surface of the lens element 2 arranged in the middle, returns to the image display apparatus 4, is reflected again, and overlaps the original image light. Therefore, in the present working example, it is preferable not only to form an antireflection film on the surface of the lens element 2 to suppress the reflection but also to design a limited surface shape of either one or both of the image-light incident surface and outgoing surface of the lens element 2 so as to be a shape avoiding the concentration of the above-described reflected light on one part of the image display apparatus 4 (such as a shape having a concave surface facing the image display apparatus 4).

A polarizing angle of the S-polarized image light that is the output of the image display apparatus 4 is changed by arrangement of the λ/16 plate (the λ/4 plate, the λ/8 plate or others is suitably selected to be balanced with the brightness) at a position closer to the image display apparatus 4 of the polarizer of the glare stop 41, and further arrangement of a mechanism for adjusting its attachment angle and movement of the λ/16 plate to, for example, a position shown with a broken line in the drawing. As a result, even when the driver wears polarizing sunglasses, the virtual image having sufficient brightness and excellent entire screen color display can be obtained by suitably changing the attachment angle of the waveplate arranged in the glare stop 41 in the present invention.

The polarizer arranged in the glare stop 41 does not lose the reliability even when absorbing the P-polarized light component of the sunlight entering the car because an area of the polarizer receiving the light is the same as that of the opening. Further, the polarizer also has an effect capable of improving a contrast performance of the virtual image formed by the information display apparatus 100 because of selectively transmitting the S-polarized light.

Figure 6:
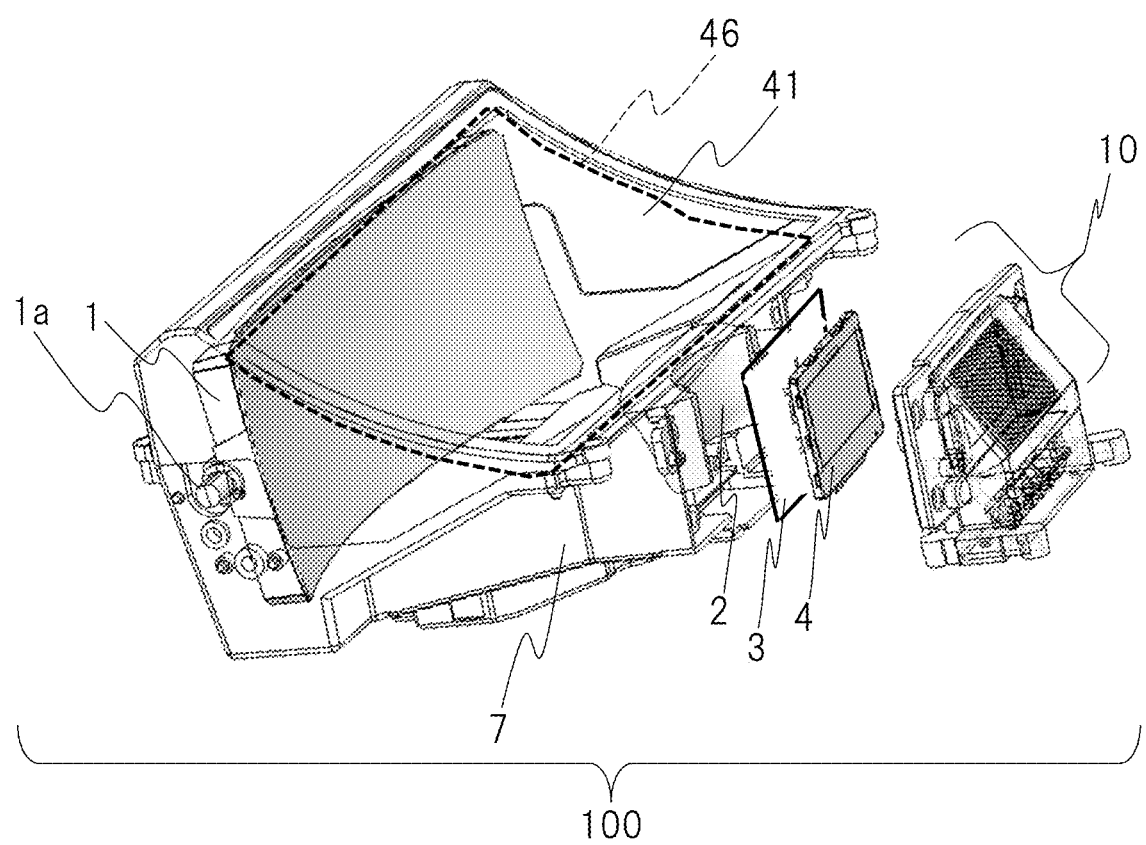
FIG. 6 is a schematic configurational diagram for explaining a function of a component according to the first information display apparatus of the in-vehicle information display system.

On the other hand, for the light source apparatus 10 used in the information display apparatus 100 of the present invention shown in FIGS. 5 and 6, it is preferable to adopt a solid light source having a long product lifetime. For example, the light source apparatus 10 is preferable to include an LED (Light Emitting Diode) having small light output change with respect to change of a peripheral temperature and a PBS (Polarizing Beam Splitter) having optical means reducing an angle of light divergence so that the light is polarized and converted by the PBS.

Since polarizers that are not illustrated are arranged at a position (the light incident surface) close to the backlight of the liquid crystal panel and a position (light outgoing surface) close to the lens element 2, the contrast ratio of the image light is increased. When an iodine-based polarizer having a high polarization degree is adopted as the polarizer at the position (the light incident surface) close to the backlight, the high contrast ratio can be obtained. On the other hand, when a dye-based polarizer is adopted as the polarizer at the position (the light outgoing surface) close to the lens element 2, the high reliability can be obtained even if the external light enters or even if the ambient temperature is high.

In the case of the usage of the liquid crystal panel as the image display apparatus 4, particularly when the driver wears the polarizing sunglasses, a specific polarized wave is blocked, and a failure to observe the image occurs. In order to prevent this problem, the λ/4 plate, the λ/8 plate or the λ/16 plate is arranged on the one-side surface of the glare stop 41 arranged in the opening as described above so that the glare occurring inside the information display apparatus does not return to the line of sight of the driver. By this plate, a direction of the glare is equalized to be the specific polarizing direction. And, it is preferable to rotate the glare stop 41 from a position shown in FIG. 5 to a position 46 shown with a broken line in FIG. 6 so that the polarizing angle of the image light is suitably changed to convert the image light to be circular polarized light or so that the polarizing axis of the linear polarized light rotates to be a polarizing axis that is different from the polarizing direction of the polarizing sunglasses. Meanwhile, when the image light is changed to be nearly the circular polarized light by the rotation of the polarizing angle, the reflectance of the image light from the information display apparatus on the windshield glass 6 decreases because the polarizing angle rotates from the state of the S-polarized light, which results in the reduction in the brightness, and therefore, it is better to select either one while balancing both of them.

From experiments, the inventors have verified that it is effective to arrange a predetermined waveplate at the position of the glare stop at which expansion of the image light flux is the largest, for reducing the color unevenness (a degree of color evenness of the entire screen in full white display) of the resultant image.

Second Information Display Apparatus of In-Vehicle Information Display System

Subsequently, a specific optical configuration of the second information display apparatus of the information display system of the present invention will be explained below.

Specific Working Example of Second Information Display Apparatus

Figure 7:
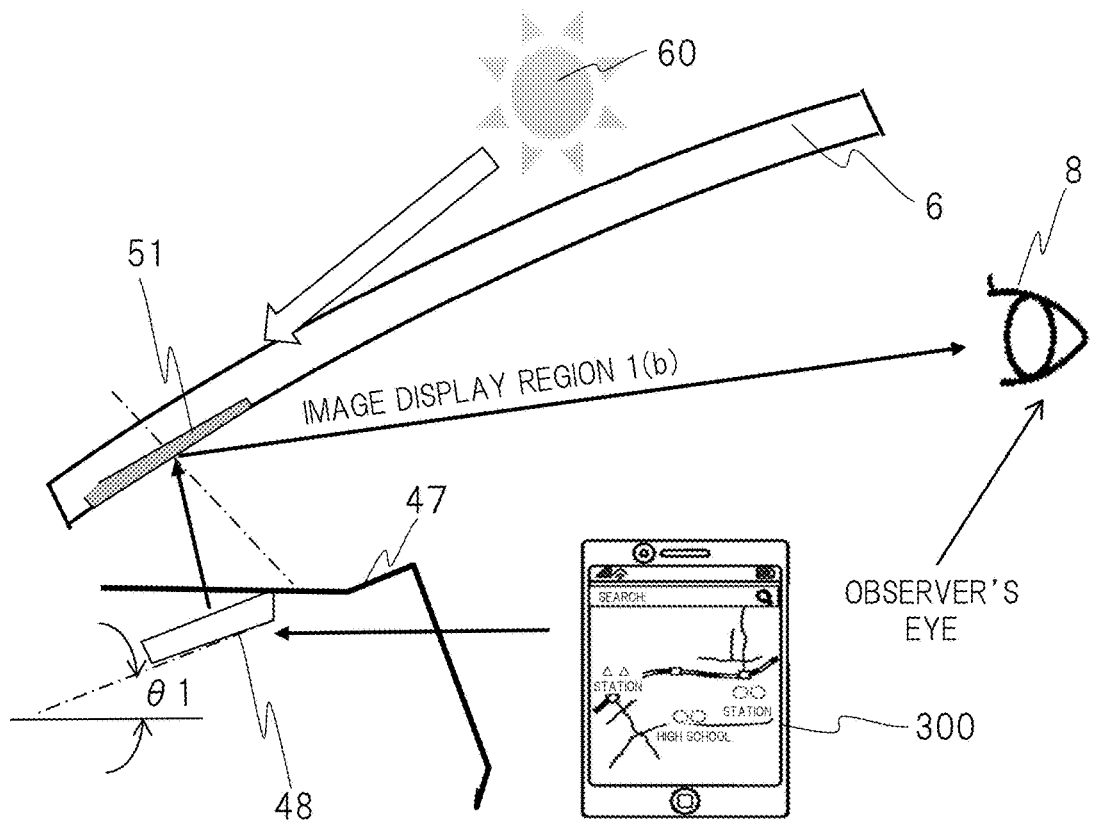
FIG. 7 is a schematic configurational diagram showing a relation among a second information display apparatus of an in-vehicle information display system, a windshield glass, an image display position, a driver's point-of-view position and sunlight.

As shown in FIGS. 3 and 7, an information display apparatus 48 that is the second information display apparatus of the present invention virtually displays the image on the windshield glass by using a film (such as a transparent film, sheet or others) 51 arranged on the surface of the windshield glass 6 to reflect the high-resolution image (the image of the large-scale high-resolution image display apparatus) from, for example, a smartphone 300 or others, toward the observer's eyes.

Figure 8:
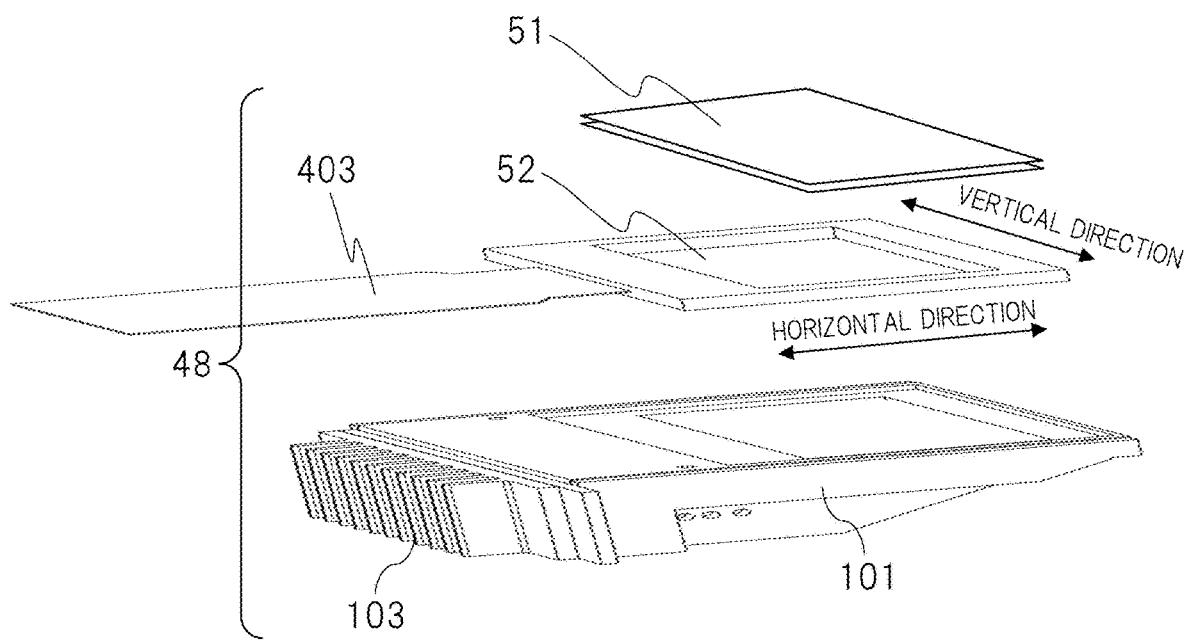
FIG. 8 is a schematic configurational diagram of a second information display apparatus of an in-vehicle information display system.

Next, a configuration of the information display apparatus 48 will be explained with reference to FIG. 8. The image display element (liquid crystal display panel) 52 is made of a relatively large liquid crystal display panel having a screen size exceeding 6 inches. Generally, since the curvature radius of the windshield glass 6 varies depending on its portion, the displayed image is distorted unevenly (in the vertical direction and the horizontal direction) depending on its portion on which the image is reflected. Therefore, correction for the distortion is necessary in order to obtain the correct image in a case of observation of the reflected image from the observing direction. For a correction level having no practical problem on the basis of this correction for the distortion, a resolution of the panel needs to be equal to or higher than 1280×720 dots.

Figure 9:
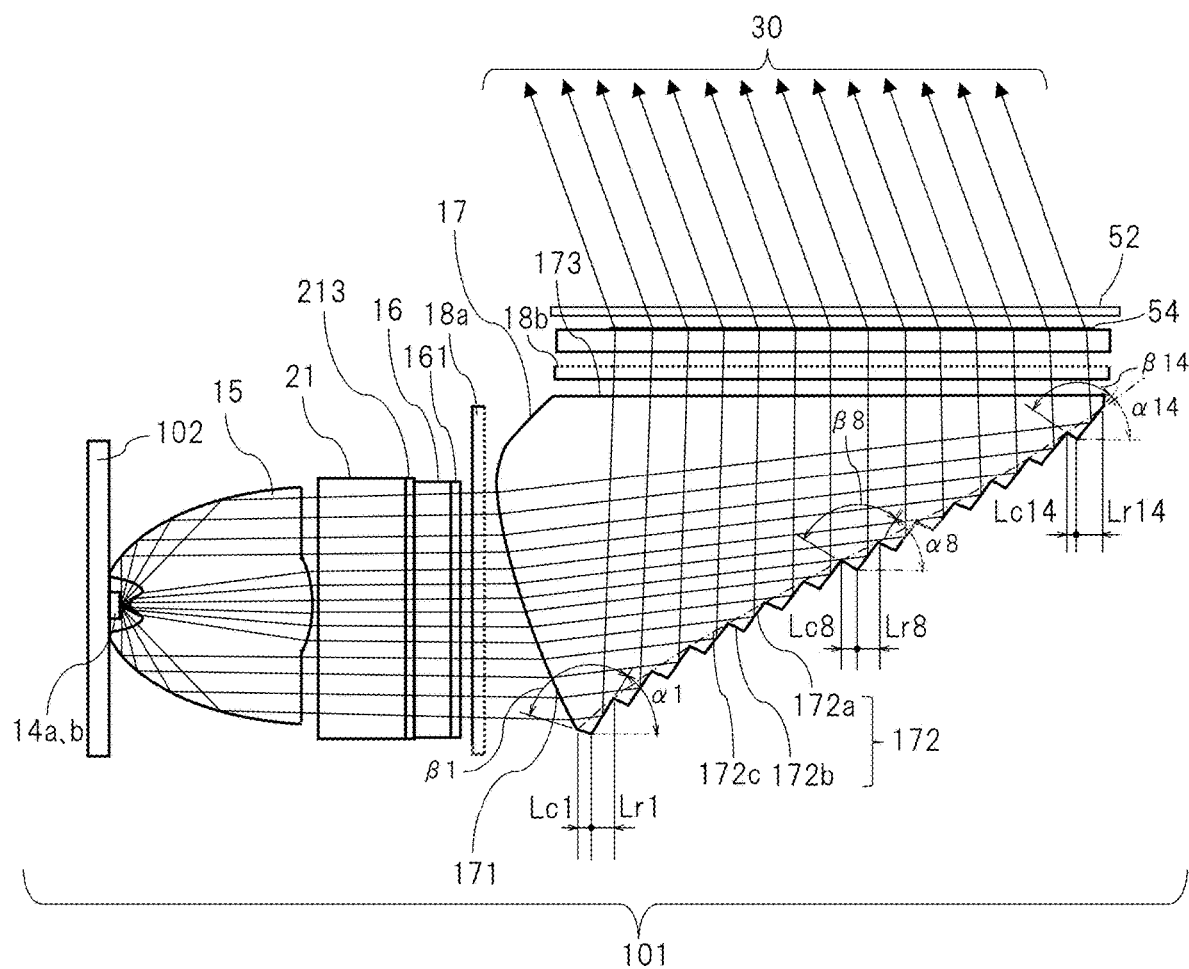
FIG. 9 is a cross-sectional view showing a configuration of a light source apparatus according to the second information display apparatus.

FIG. 9 is an exploded perspective view showing an image display element 52 and the light source apparatus 101 arranged below this image display element and configuring its light source. This image display element (liquid crystal display panel) 52 receives the illumination light flux having strong directionality from the light source apparatus 101 that is the backlight apparatus, and outputs the image light that is modulated by an image signal, toward the film 51 arranged on the windshield glass 6. In FIG. 9, the information display apparatus 48 includes the image display element 52, and besides, a light-direction converting panel 54 and a second dispersion plate 18b controlling the directionality of the outgoing light flux 30 from the light source apparatus 101. In other words, polarizers are arranged on both-side surfaces of the information display apparatus 48 (see FIG. 8), and are configured to output a specific polarized image light, a light intensity of which is modulated by the image signal. In this manner, the high-resolution image (the image of the large-scale high-resolution image display apparatus) from the smartphone 300 or others is projected onto the windshield glass 6, and is reflected toward the observer's eyes by the film 51 arranged on its surface.

The light source apparatus 101 is made of, for example, plastic or others. The light source apparatus 101 includes a case (enclosure, see FIG. 8) for the light source apparatus 101 housing an LED, a collimator, a synthesis/dispersion block, a light guide and others described later. To an upper surface of the light source apparatus 101, the image display element 52 of the information display apparatus 48 is attached. And, an LED substrate 102 (see FIGS. 9 to 10) on which an LED (Light Emitting Diode) element that is a semiconductor light source and a control circuit for the LED element are mounted is attached to one of side surfaces of the case of the light source apparatus 101, and a heat sink 103 for use in cooling heat of the LED element and the control circuit is attached to an outer surface of the LED substrate 102 (see FIG. 8).

On the other hand, the image display element 52 attached to the upper surface of the light source apparatus 101 is made of a liquid crystal display panel frame and a liquid crystal display panel attached to this frame, and besides, an FPC (Flexible Printed Circuits: flexible wiring board) 403 (see FIG. 8) that is electrically connected to this panel and others. That is, although explained in detail later, the image display element 52 generates and controls the displayed image together with the LED element that is the sold light source in accordance with a control signal output from the control circuit (not illustrated) configuring an electronic apparatus.

Subsequently, a configuration of the light source apparatus 101, that is, an optical system housed in the case of the light source apparatus 101 will be explained in detail below with reference to FIGS. 9 and 10.

Figure 10:
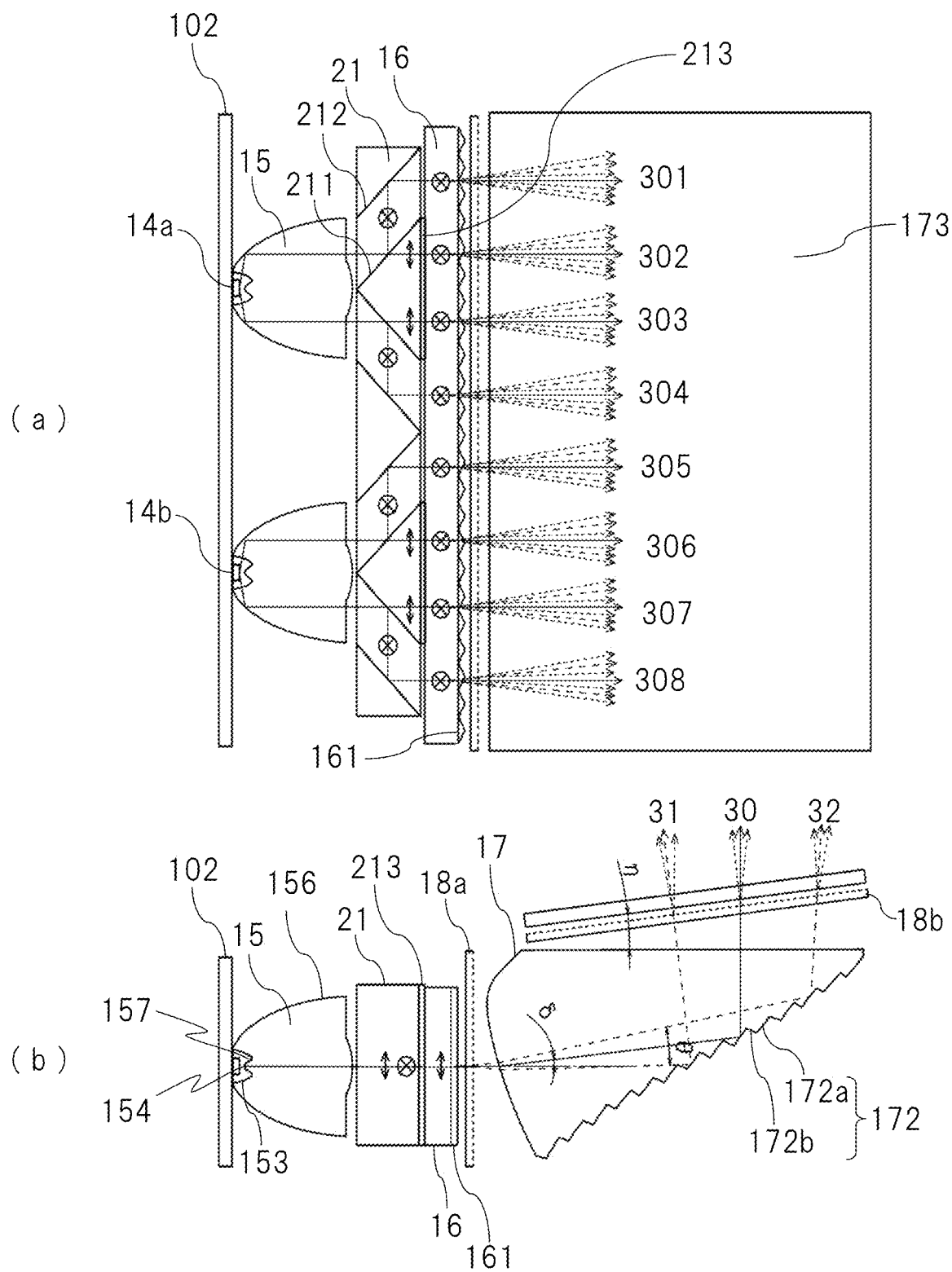
FIG. 10 is a top view and a cross-sectional view showing a configuration and a function of the light source apparatus according to the second information display apparatus.

FIGS. 9 and 10 show a plurality of (in the present example, two) LEDs 14a and 14b (not illustrated) configuring the light source, and these LEDs are attached to predetermined positions corresponding to the LED collimators 15. Note that each LED collimator 15 is made of, for example, a light-transmittable resin such as an acrylic resin. As also shown in FIG. 10(b), this collimator 15 has a conical-convex outer circumferential surface 156 resulted from rotation of a paraboloid cross section, and besides, has a concave portion 153, a center of which has a convex lens portion (that is, a convex lens surface) 157, at a top of the collimator. A center of the convex lens portion 157 has an outwardly-protruding convex lens surface (or may be an inwardly-recessed concave lens surface) 154. An outer circumferential surface 156 that forms the conical-shaped outer circumferential surface of the LED collimator 15 is set in a range of an angle at which the outgoing light from the LED 14a is peripherally fully reflected on its inside, or has the reflecting surface formed therein.

Meanwhile, each of the LEDs 14a and 14b is arranged at a predetermined position of the surface of its circuit board that is so-called LED substrate 102. Each of the LEDs 14a and 14b arranged on the surface of the LED substrate 102 is arranged and fixed at the center position of the concave portion 153 of the LED collimator 15.

According to this configuration, among light that is emitted from the LED 14a or 14b by the LED collimator, light that is emitted upward (rightward in the drawing) from its center is particularly collected by the convex lens portion 157 and the convex lens surface 154 forming the outer shape of the LED collimator 15, and becomes collimated light. And, peripherally-outgoing light from another portion is reflected by the paraboloid surface forming the conical-shaped outer circumferential surface of the LED collimator, and is similarly collected and becomes the collimated light. In other words, by the LED collimator 15 having the convex lens at its center and having the paraboloid surface formed in the peripheral portion of the lens, almost all the light that is created by the LED 14a or 14b can be extracted as the collimated light, so that the use efficiency of the created light can be improved.

Note that a polarization converting element 21 described in detail later is arranged at a portion closer to the light outgoing side of the LED collimator 15. As clearly seen in the drawing, the polarization converting element 21 is formed of a combination of a transmittable member having a pillar shape with a parallelogram cross-sectional surface (hereinafter, referred to as parallelogram pillar shape) and a transmittable member having a pillar shape with a triangular cross-sectional surface (hereinafter, referred to as triangular pillar shape), and a plurality of the polarization converting elements 21 are arranged in an array formation in parallel to a plane that is orthogonal to the optical axis of the collimated light output from the Led collimator 15. Further, a PBS film 211 and a reflecting film 212 are alternately arranged at a boundary between the adjacent transmittable members in the array formation, and a ½ λ waveplate 213 is arranged on an outgoing surface from which the light having entered the polarization converting element 21 and penetrated the PBS film 211 is output.

On an outgoing surface of this polarization converting element 21, a rectangular synthesis/dispersion block 16 shown in FIG. 10(a) is further arranged. In other words, the outgoing light from the LED 14a or 14b is converted into the collimated light by the function of the LED collimator 15, enters the synthesis/dispersion block 16, is dispersed by a texture 161 on the outgoing side, and then, reaches a light guide 17 described later.

The light guide 17 is a member having, for example, a rod shape with a substantially triangular cross-sectional surface (see FIG. 10(b)) made of a transmittable resin such as an acrylic resin, and, as clearly seen in FIG. 10(a), has a light-guide light incident portion (light-guide light incident surface) 171 that faces the outgoing surface of the synthesis/dispersion block 16 across the first dispersion plate 18a, a light-guide light reflecting portion (light-guide light reflecting surface) 172 that forms an oblique surface, and a light-guide light outgoing portion (light-guide light outgoing surface) 173 that faces the liquid crystal display panel including the image display element 52 across the second dispersion plate 18b.

The light-guide light reflecting portion 172 of the light guide 17 has a lot of reflecting surfaces 172a and joint surfaces 172b that are alternately formed in a comb-teeth formation as shown in FIG. 9 that is a diagram partially enlarging the light-guide light reflecting portion. The reflecting surface 172a (a right-upward slope line component in the drawing) forms an angle α "n" (n: natural number that is, for example, 1 to 130 in the present example) with respect to a horizontal surface shown with a dashed dotted line in the drawing. In one example described here, the angle α "n" is set to be equal to or smaller than 43 degrees (but equal to or larger than 0 degree).

As a result, the light-guide light incident portion 171 is formed to have a curved convex shape sloping toward the light source. By this shape, the collimated light that is output from the outgoing surface of the synthesis/dispersion block 16 is dispersed by the first dispersion plate 18a, enters the light guide 17, and reaches the light-guide light reflecting portion 172 while being slightly refracted (polarized) upward by the light-guide light incident portion 171 as clearly seen in the drawing.

As described in detail above, by the information display apparatus 48 according to the present invention, the light use efficiency and the illumination evenness are more improved, and besides, the apparatuses including the modularized light source apparatus for the S-polarized wave can be downsized and manufactured at a low cost. In the above explanation, the polarization converting element 21 is attached after the LED collimator 15. However, the present embodiment is not limited to this, and it would be anticipated by those who are skilled in the art that the same function and effect can be obtained by arrangement of this at any position of the light path reaching the liquid crystal display panel.

Note that the light-guide light reflecting portion 172 has a lot of reflecting surfaces 172a and joint surfaces 172b that are alternately formed in a comb-teeth formation. The dispersed light that is dispersed by the first dispersion plate 18a is fully reflected on each reflecting surface 172a, and travels upward. The upward-travelling dispersed light is converted into the parallel dispersed light flux, travels through the light-guide light outgoing portion 173 and the second dispersion plate 18b, and enters the light-direction converting panel 54 that controls the directionality. The light-direction converting panel 54 converts the light direction of this dispersed light flux. The dispersed light flux, the light direction of which has been converted, is output in, for example, a direction shown in FIG. 9 from the light-direction converting panel 54, and obliquely enters the image display element 52.

Figure 11:
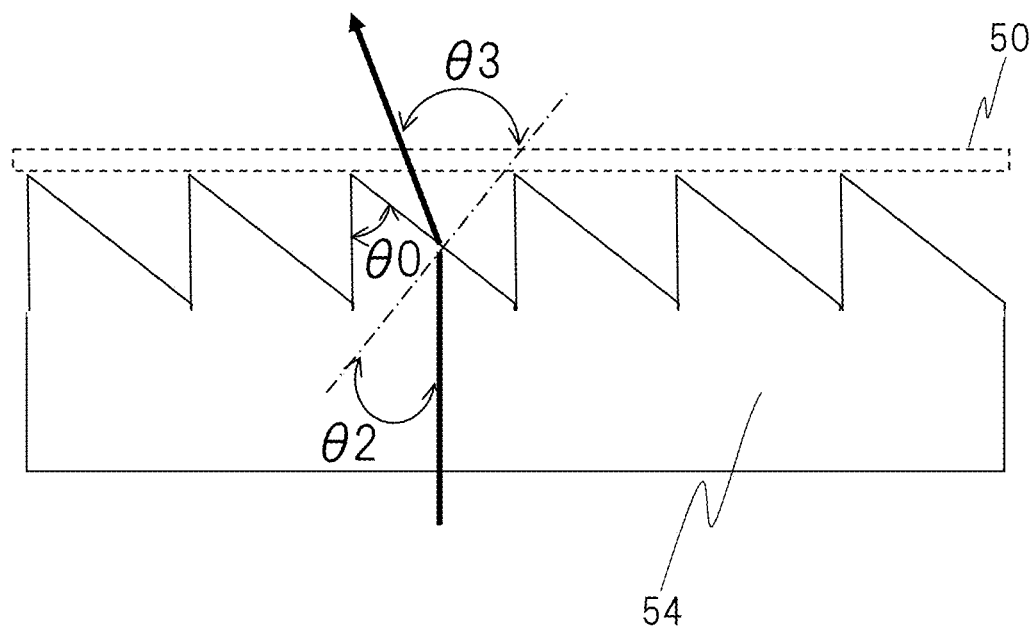
FIG. 11 is an explanatory diagram for explaining a function of an optical component configuring the light source apparatus according to the second information display apparatus.

FIG. 11 is a schematic explanatory diagram for explaining a principle of the light-direction converting panel 54 arranged in the information display apparatus 48. The light flux output from the light guide enters through the incident surface of the light-direction converting panel, and the light flux is refracted in a desirable direction "θ3" by a lens function of a linear Fresnel lens arranged in the outgoing surface of the same. At this time, the desirable direction "θ3" is primarily derived from an incident angle "θ2" of the light flux on the linear Fresnel lens, a Fresnel angle "θ0" of the linear Fresnel lens and a refractive index "n" of a base member on the basis of the Snell's law. As a result, the collimated light flux output from the light guide can be directed in a desirable direction.

Similarly, by arrangement of the linear Fresnel lens having the structure shown in FIG. 11 on the light outgoing surface of the image display apparatus 48, the light can be directed in a direction toward the windshield glass 6 becoming the reflecting surface for the image light flux. As a result, even when the driver directly observes the screen of the image display apparatus 48, this action does not become a trouble for the driving since the image light does not directly reach the eyes. A pitch of the linear Fresnel lens is desirable to be equal to or smaller than ⅓ of a pixel pitch of the image display apparatus 48. For example, in order to reduce a moire that is caused by a pitch ratio between the pixel and the linear Fresnel lens to be down to an ignorable level in practical use, the pitch of the linear Fresnel lens is preferable to be equal to or smaller than ⅐ of the pixel pitch. And, in order to protect the linear Fresnel lens from being worn or others, a protection cover (illustrated with a broken line) is arranged on a surface.

Figure 12:
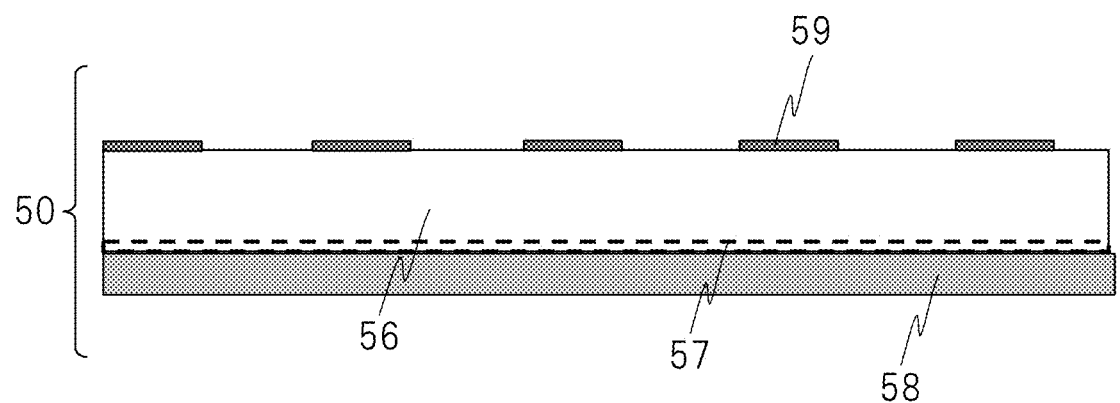
FIG. 12 is a conceptual diagram for explaining a configuration of the optical component according to the second information display apparatus.

FIG. 12 is a lateral cross-sectional view showing a schematic configuration of a protection cover 50 in contact with a dashboard 47 of the image display apparatus 48. A black stripe 59 is formed in a part of a light outgoing side of a substantially transparent base member 56. The black stripe 59 reduces surface reflection of the external light including the sunlight. For the black stripe 59, for example, a black paint containing carbon black is used. In a portion without the black stripe, an antireflection film for use in suppressing the surface reflection is arranged. By the antireflection film, the external-light reflection on a surface of the protection cover 50 is significantly reduced, and a trouble due to the external-light reflection in the driving of the subject car by the driver is reduced.

Meanwhile, on the light outgoing side of the substantially transparent base member 56, a membrane or a film 58 absorbing or reflecting the P-wave component of the sunlight flux is formed or pasted. As a result, the P-wave component of the sunlight does not enter the information display apparatus 48, and therefore, reliability for light resistance and heat resistance is significantly improved. And, the film 58 also has a filter property that selectively transmits the S-polarized image light output from the information display apparatus 48, and therefore, the contrast performance of the resultant image is significantly improved.

Since the image source of the information display apparatus 48 is the liquid crystal panel, the failure to observe the image because of the blocking of the specific polarized wave occurs when the driver wears the polarizing sunglasses as similar to the information display apparatus 100. In order to prevent the failure, a waveplate 57 such as the $\lambda/4$ plate, the $\lambda/8$ plate or the $\lambda/16$ plate is arranged between the film 58 of the protection cover 50 of the information display apparatus 48 and the base member 56. The light polarizing direction of the light flux is unified to a specific direction by the arrangement of the waveplate, and is favorably shifted by a desirable degree of the light polarizing axis from the light polarizing direction of the polarizing sunglasses so as to have the light polarizing angle at which the image light is optimum.

Meanwhile, when the light polarizing axis rotates so that the light is close to the circular polarized light, the light polarizing axis of the image light that is output from the information display apparatus rotates from the state of the S-polarized light. Therefore, the reflectance on the windshield glass 6 decreases, and the image brightness decreases, and thus, it is better to select the state while balancing both of them.

Specific Working Example of In-Vehicle Information Display System

Figure 13:
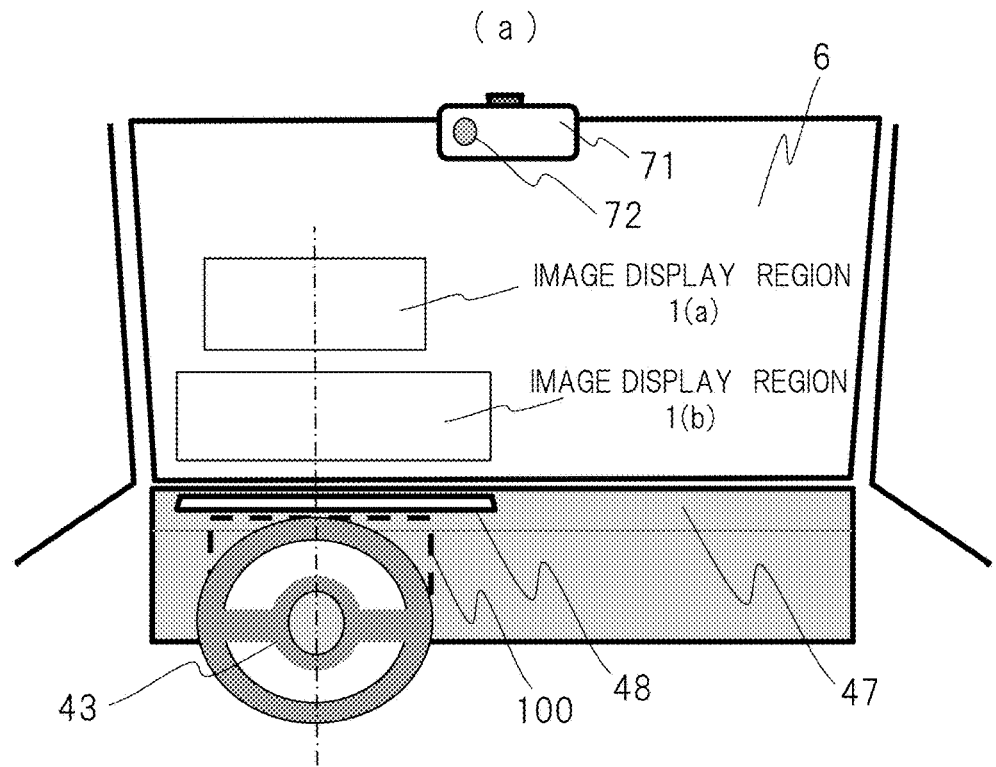
FIG. 13 is a schematic configurational diagram showing an example of a cockpit of a car provided with the first information display apparatus and the second information display apparatus configuring the in-vehicle information display system.
Figure 13:
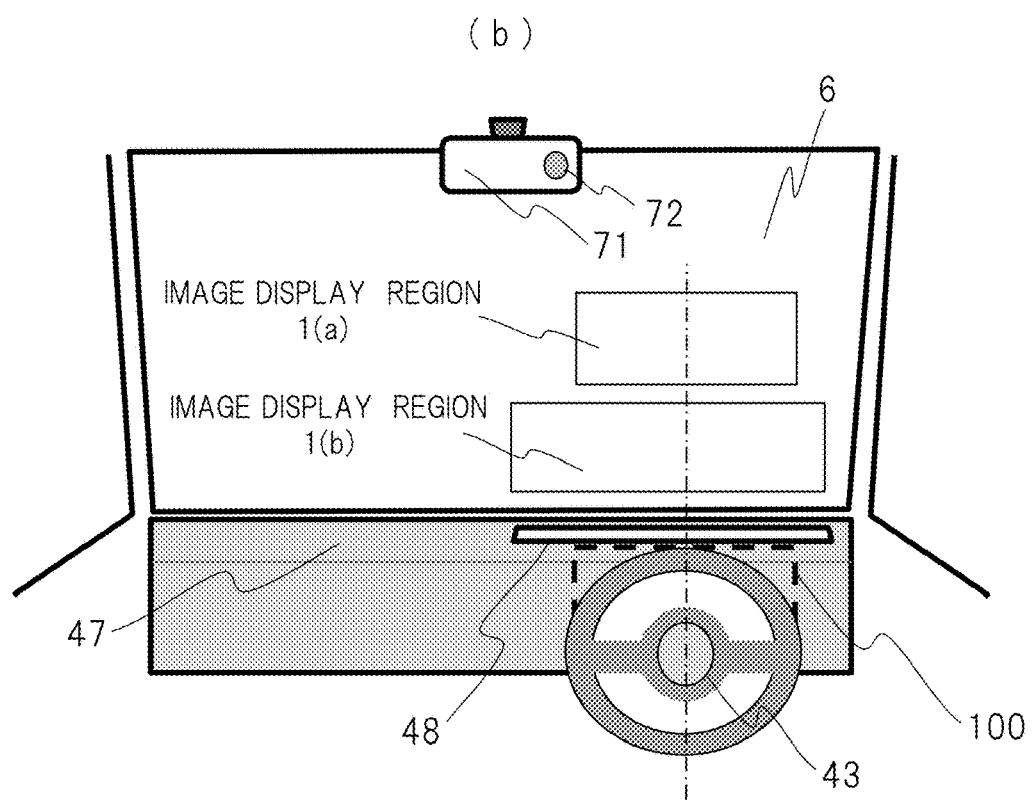

FIG. 13 shows one example of an inner layout of a cockpit of the car having the information display system including the information display apparatus 100 and the information display apparatus 48 according to the present invention. FIG. 13(a) shows a system supporting for a car having a steering on its left side, and FIG. 13(b) shows a system supporting for a car having a steering on its right side. In an image display region 1(a) in the drawing, the information display apparatus 100 is used to cause the windshield glass 6 to reflect the image information so that the virtual image is observed by the driver. In an image display region 1(b) in the drawing, the image information that has been displayed on the information display apparatus 48 is reflected by the windshield glass so that the real image is observed by the driver. Note that the image information may be reflected by the combiner arranged in the film 51.

As shown in FIG. 3, the information display apparatus 100 and the information display apparatus 48 are arranged between the windshield glass 6 and the steering 43. Inside the dashboard 47, the image display apparatus 48 and the information display apparatus 100 are sequentially arranged in this order from the windshield glass 6 toward the steering 43. A result of this technique provides the information display system that causes the windshield glass 6 to reflect the image to provide the driver with the image information of the external scenery to be observed through the windshield glass 6 when the driver is driving the subject car, the information display system partitioning the windshield glass 6 into the plurality of regions, in some of which the large-scale virtual image is displayed at a distant position by the head-up-display apparatus serving as the information display apparatus 100, while, for example, in a lower end region of which (the image is displayed in a region corresponding to the bonnet (hood) of the subject car) the image of the large-scale high-resolution information display apparatus 48 serving as the second information display apparatus is reflected by the windshield glass 6 so that the reflected image is directly observed by the driver or the passenger. As a result, the necessary information for the driver can be suitably displayed so that the resolution and the image size vary depending on the display region of the windshield glass 6.

Note that a camera 72 for use in monitoring a state of the driver and monitoring a state of inside of the car is arranged at a rear-view mirror 71 in FIG. 13, so that the outgoing direction of the image light that is output from the information display apparatus is controlled in accordance with, for example, a height of the driver's eye.

Figure 14:
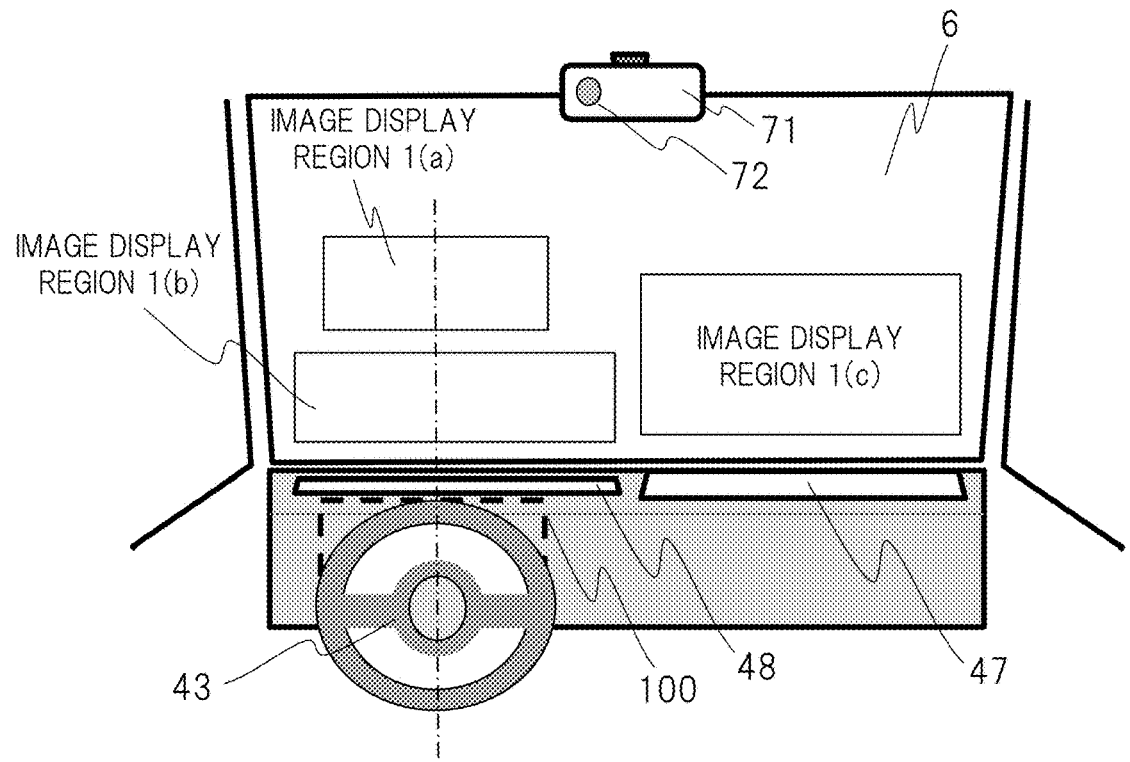
FIG. 14 is a schematic configurational diagram showing another example of the cockpit of the car provided with the first information display apparatus and the second information display apparatus configuring the in-vehicle information display system.
Figure 14:
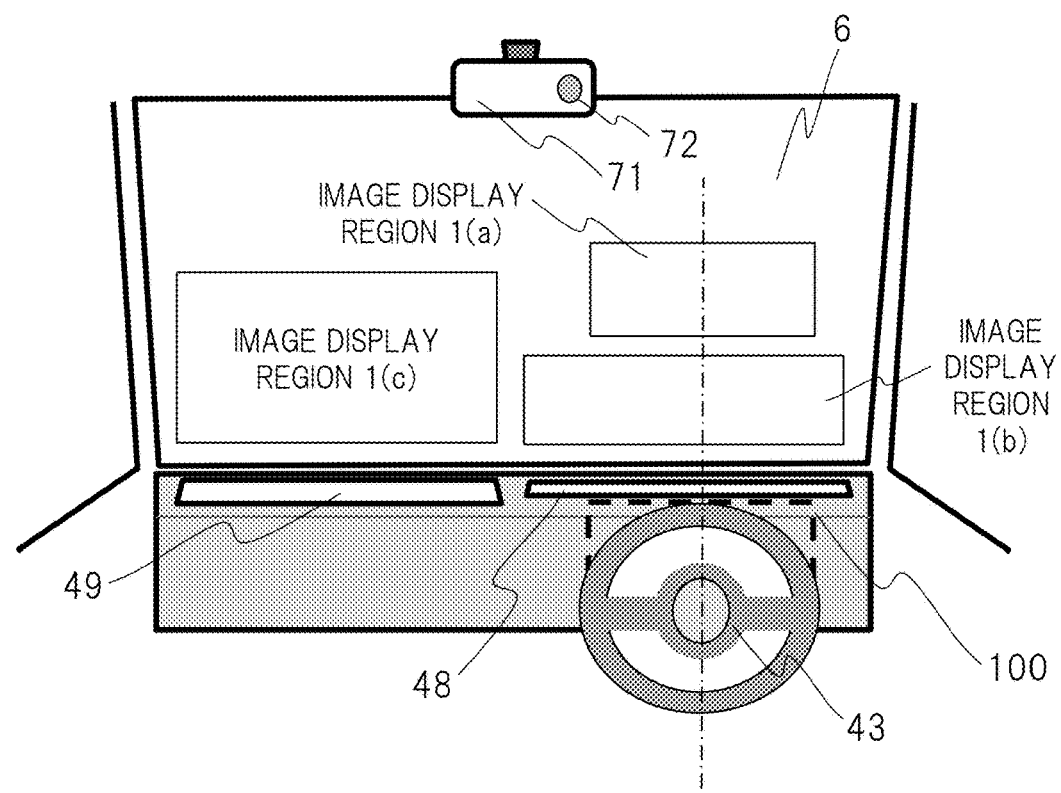

FIG. 14 is a schematic diagram showing the information image system also providing the passenger on the passenger seat with the image information. As similar to FIG. 13, FIG. 14(a) shows a system supporting for the car having the steering on its left side, and FIG. 14(b) shows a system supporting for the car having the steering on its right side. In an image display region 1(a), the information display apparatus 100 is used to cause the windshield glass to reflect the image information so that the virtual image is observed by the driver. In an image display region 1(b), the image information that has been displayed on the information display apparatus 48 is reflected by the windshield glass so that the real image is observed by the driver. In this manner, the image information that has been displayed by an apparatus (not illustrated) having the same configuration as that of the image display apparatus 48 is reflected to an image display region 1(c) of the windshield glass so that the real image is observed by the passenger.

Note that it would be clear that the film 51 (see FIG. 7) is pasted or adhered to portions of the windshield glass 6 corresponding to the image display region 1(b) and the image display region 1(c).

Figure 15:
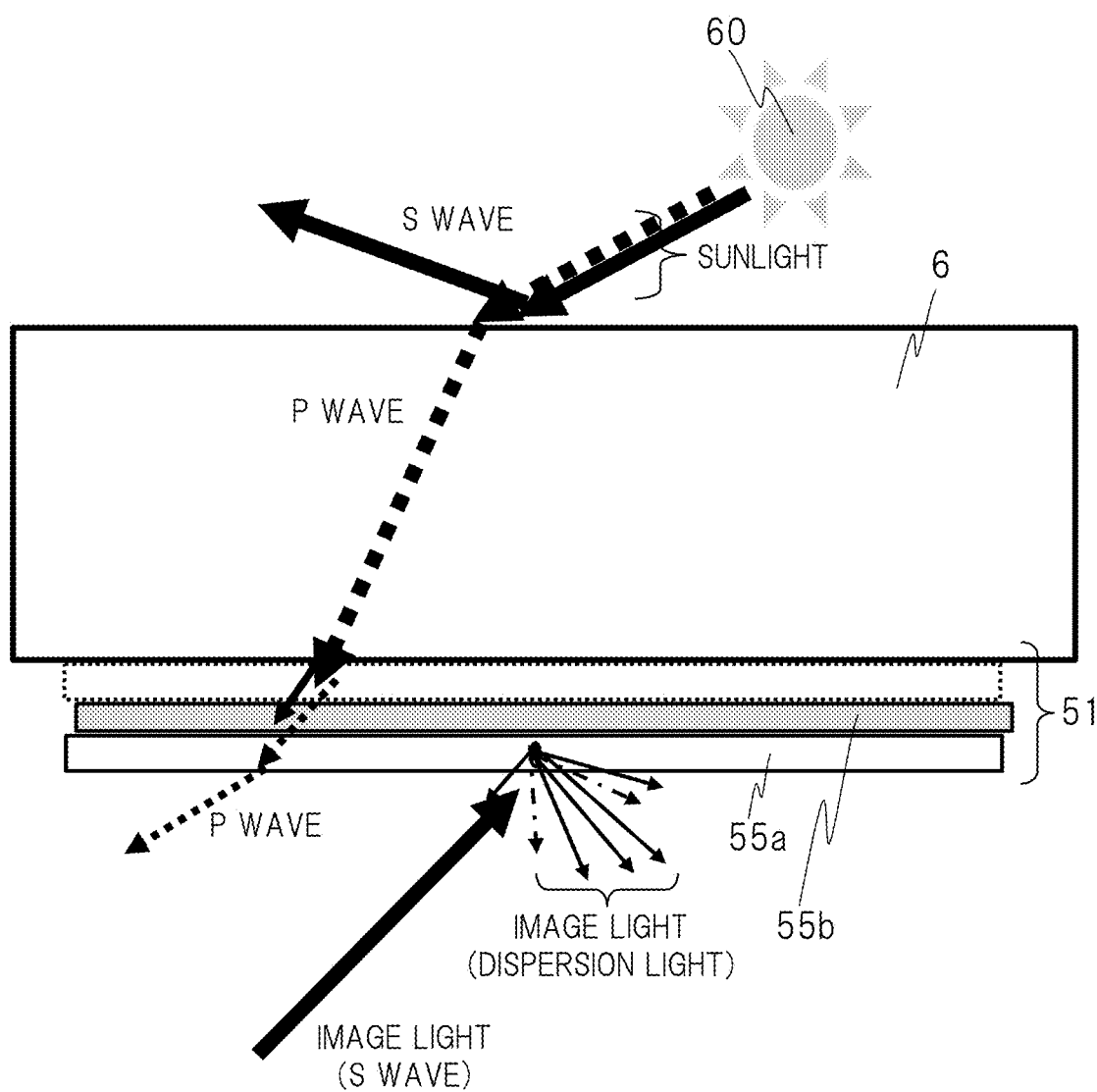
FIG. 15 is a diagram for explaining a configuration of a film adhered on a windshield glass in an in-vehicle information display system.

Next, the configuration of the film 51 will be explained with reference to FIG. 15. Among the incident sunlight in a direction that is oblique to the windshield glass 6 (that is hypothetically horizontally arranged for convenience of the explanation), the S-polarized wave is reflected while the P-polarized wave penetrates and travels toward the film 51. The film 51 is made of a polarizer 55b and a transparent dispersion sheet 55a transmitting the S wave. The transparent dispersion sheet 55a is a film formed by melting and elongating a thermoplastic polymer containing dispersing nanoparticle zirconium or nanoparticle diamond having a large refractive index, and is, for example, "KALEIDO SCREEN" produced by JXTG energy (ENEOS corporation) or others. When the transparent dispersion sheet 55*a* is used, the transparent dispersion sheet does not bother the driver to observe the scenery of the outside (out of the car) because of being transparent when the image is not displayed. On the other hand, when the image is displayed, this can disperse the image light so that the image information can be observed by the driver or the passenger.

While the image light that is output from the information display apparatus 48 is the S-polarized wave, a part of the image light that disperses in the transparent dispersion sheet 55*a* is nearly the P-polarized wave because its polarizing direction is rotated with respect to the windshield glass 6. This light is absorbed by the polarizer 55*b*, and therefore, is not reflected by a plane in contact with the outside of the windshield glass 6. Therefore, the reflected image on the film 51 does not become a double image caused by the reflected image on the windshield glass 6.

Similarly, it is needless to say that the same effect can be obtained even when the film 51 is pasted on the combiner as the reflecting surface of the image in place of the windshield glass 6.

In the above-described information display system and first information display apparatus of the present invention, (1) the P-polarized sunlight component that has penetrated the windshield glass (and then, also penetrated the combiner in the combiner mode) under the predetermined condition in the daytime is absorbed before the concave mirror, so that the light does not return to the liquid crystal panel and the polarizer. (2) When the first information display apparatus is not used, the concave mirror rotates by a predetermined angle to prevent the sunlight from returning to the image display apparatus, so that the sunlight that is collected by the concave mirror is prevented from returning to the image display apparatus.

Further, this manner provides the information display system having the large-scale high-resolution second information display apparatus arranged at the position of the dashboard corresponding to the image display region of the lower end region of the windshield glass so that the reflected image of the displayed image on the windshield glass is directly observed by the driver or the passenger. Since the transparent screen having the function of dispersing the image light is arranged in the portion of the windshield glass corresponding to the second image display position so that the light is effectively reflected, the image quality that is no problem in practical use can be provided to the driver or the passenger. The large-scale high-resolution second image display apparatus controls the outgoing direction of the image light due to the high luminance, so that the image light is prevented from directly entering the driver's or passenger's eye.

In the information display apparatus overlapping the image information that is reflected by the windshield glass with the external scenery to be observed through the windshield glass when the driver is driving the subject car, the present embodiment provides the in-vehicle information display system and the information display apparatus for the system, that partition the windshield glass into the plurality of regions, in some of which the large-scale virtual image is displayed at a distant position by the head-up-display apparatus, while, for example, in a lower end region of which the image of the large-scale high-resolution information display apparatus is reflected by the windshield glass so that the reflected image is directly observed by the driver or the passenger, which results in the image information having the high image quality that is supportable for the high resolution of the displayed image on the information terminal such as the smartphone.

Further, the large-scale high-resolution image display apparatus reduces the energy of the incident light on the image display apparatus by absorbing not only mainly the infrared ray component of the sunlight but also a part of the P-polarized light component of the light in the wide wavelength band. And, the protection cover is arranged on the surface of the high-resolution image display apparatus (such as the liquid crystal display panel), and the light absorbing layer is formed on one surface of the protection cover to absorb apart of the sunlight while the polarizer is arranged on the other surface of the same to absorb the P-polarized sunlight, so that the adverse influence on the polarizer formed with the liquid crystal display apparatus (such as the liquid crystal display panel) can be reduced.

Further, the image light of the large-scale high-resolution image display apparatus is directed so that the light is laid not to directly enter the driver's eye. Since the image light is converted from the dispersed light to the light flux with the directionality, the light use efficiency can be also increased.

Various working examples have been described above. However, the present invention is not limited to the above-described working examples, and include various modification examples. For example, in the above-described working examples, the entire system has been explained in detail for easily understanding the present invention, and the working examples are not always limited to the one including all structures explained above. Also, a part of the structure of one working example can be replaced with the structure of another working example, and besides, the structure of another working example can be added to the structure of one working example. Further, another structure can be added to/eliminated from/replaced with a part of the structure of each working example.

EXPLANATION OF REFERENCE CHARACTERS

100 . . . information display apparatus (first information display apparatus), 1 . . . concave mirror, 2 . . . lens element, 4 . . . image display apparatus (liquid crystal display element, liquid crystal display panel), 6 . . . windshield glass (projection-receiving member), 7 . . . enclosure, V1 . . . virtual image, 8 . . . eyepoint (observer's eye), 101 . . . light source apparatus, 41 . . . glare stop, 43 . . . steering, 47 dashboard, 48 . . . information display apparatus (second information display apparatus), 50 . . . protection cover, 51 . . . film, 55*a* . . . transparent dispersion sheet, 55*b* polarizer, 57 . . . waveplate, 58 . . . film, 52 . . . image display element, 59 . . . black stripe, 1010 . . . car, 300 . . . smartphone

The invention claimed is:

1. An information display apparatus for use in configuring a display information system causing a windshield glass of a vehicle to reflect image it to display image information for an Observer, comprising, inside an enclosure partially having an opening:

a light source configured to generate image light for use in displaying the image information;

an optical structure configured to perform a predetermined optical process to the image light output from the light source; and a light projector configured to project the image light output from the optical structure so that the observer recognizes the image information as a virtual image on a forward part of the windshield glass through the opening of the enclosure, wherein a glare stop is arranged so as to be rotatable in the opening of the enclosure.

2. The information display apparatus according to claim 1, wherein a light polarizing layer having a λ/4 plate, a λ/8 plate, or a λ/16 plate to transmit S-polarized light is arranged on one-side surface of the glare stop.

3. An information display apparatus for use in configuring an information display system causing a windshield glass of a vehicle to reflect image light to display image information for an observer, comprising:

a backlight apparatus configured to generate illumination light flux;

a display panel configured to modulate the illumination light flux of the backlight apparatus in accordance with the image information and emitting the light to the windshield glass;

a light-direction converting panel arranged on a part of the windshield glass and configured to convert the image light of the display panel so that the observer recognizes a reflected image overlapped with a foreground external scenery of the windshield glass; and a protection cover made of a substantially transparent base member in contact with an image display surface, wherein a black stripe is arranged in a part of a light outgoing side of the protection cover, or a film or a membrane configured to absorb or reflect a P-polarized wave component of a light flux is arranged in a light incident side of the protection cover.

4. The information display apparatus according to claim 3, wherein the backlight apparatus partially includes a Fresnel lens.

5. The information display apparatus according to claim 3, wherein the light-direction converting panel partially includes a linear Fresnel lens configured to refract a light flux in a desirable direction.

6. The information display apparatus according to claim 3, wherein an antireflection film is further arranged between the black stripes that are adjacent to each other in the protection cover.

7. The information display apparatus according to claim 3, wherein, in the light-direction converting panel, a transparent diffusing sheet and a polarizer are sequentially arranged in this order from an image-light incident surface toward the windshield glass.

8. The information display apparatus according to claim 7, wherein the polarizer configuring the light-direction converting panel absorbs S-polarized image light.

9. The information display apparatus according to claim 7, wherein the polarizer configuring the light-direction converting panel reflects S-polarized image light.

10. An information display apparatus for use in configuring an information display system causing a windshield glass of a vehicle to reflect image light to display image information for an observer, comprising:

a backlight apparatus configured to generate illumination light flux;

a display panel configured to modulate the illumination light flux of the backlight apparatus in accordance with the image information and emitting the light to the windshield glass;

a light-direction converting panel arranged on a part of the windshield glass and configured to convert the image light of the display panel so that the observer recognizes a reflected image overlapped with a foreground external scenery of the windshield glass; and a protection cover made of a substantially transparent base member in contact with an image display surface and having a linear Fresnel sheet on its one-side surface.

11. The information display apparatus according to claim 10, wherein the backlight apparatus partially includes a Fresnel lens.

12. The information display apparatus according to claim 10, wherein the light-direction converting panel partially includes a linear Fresnel lens configured to refract a light flux in a desirable direction.

13. The information display apparatus according to claim 10, wherein, in the light-direction converting panel, a transparent diffusing sheet and a polarizer are sequentially arranged in this order from an image-light incident surface toward the windshield glass.

14. The information display apparatus according to claim 13, wherein the polarizer configuring the light-direction converting panel absorbs S-polarized image light.

15. The information display apparatus according to claim 13, wherein the polarizer configuring the light-direction converting panel reflects S-polarized image light.

* * * * *